US012673263B2

(12) United States Patent
Liu et al.

(10) Patent No.: US 12,673,263 B2
(45) Date of Patent: Jul. 7, 2026

(54) METHOD AND APPARATUS FOR CONTROLLING HUMAN-COMPUTER INTERACTION INTERFACE, DEVICE, AND MEDIUM

(71) Applicant: Tencent Technology (Shenzhen) Company Limited, Shenzhen (CN)

(72) Inventors: Zhihong Liu, Guangdong (CN); Li Yao, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 744 days.

(21) Appl. No.: 17/975,347

(22) Filed: Oct. 27, 2022

(65) Prior Publication Data

US 2023/0055890 A1 Feb. 23, 2023

Related U.S. Application Data

(63) Continuation of application No. PCT/CN2021/137774, filed on Dec. 14, 2021.

(30) Foreign Application Priority Data

Dec. 30, 2020 (CN) .......................... 202011614714.3

(51) Int. Cl.
*A63F 13/69* (2014.01)
*A63F 13/537* (2014.01)
(Continued)

(52) U.S. Cl.
CPC ............ *A63F 13/55* (2014.09); *A63F 13/537* (2014.09); *A63F 13/58* (2014.09); *A63F 13/60* (2014.09);
(Continued)

(58) Field of Classification Search
CPC .......... A63F 13/55; A63F 13/58; A63F 13/60; A63F 13/63; A63F 13/69; A63F 13/822; A63F 2300/807
See application file for complete search history.

(56) References Cited

U.S. PATENT DOCUMENTS

| | | | |
|---|---|---|---|
| 11,229,840 B2 | 1/2022 | Guo et al. | |
| 11,413,528 B2 | 8/2022 | Wang et al. | |

(Continued)

FOREIGN PATENT DOCUMENTS

| | | |
|---|---|---|
| CN | 103617029 A | 3/2014 |
| CN | 106779933 A | 5/2017 |

(Continued)

OTHER PUBLICATIONS

"Steam Community: Guide: PUBG-Airdrop full guide," published Dec. 20, 2017. Source: https://steamcommunity.com/sharedfiles/filedetails/?I=french&id=1102691056 (Year: 2017).*

(Continued)

*Primary Examiner* — Steven J Hylinski

(74) *Attorney, Agent, or Firm* — Crowell & Moring LLP

(57) ABSTRACT

Methods and apparatuses for controlling a human-computer interaction interface are provided. A setting operation of a virtual prop container is received before a virtual game session is started. Configuration information of the virtual prop container is generated according to the received setting operation. The virtual game session is then started. The virtual prop container is displayed in a virtual environment of the virtual game session. In response to a prop acquisition operation performed by a virtual object on the virtual prop container, a virtual prop is granted to the virtual object according to the configuration information.

20 Claims, 9 Drawing Sheets

(51) Int. Cl.

| | | |
|---|---|---|
| *A63F 13/55* | (2014.01) | |
| *A63F 13/58* | (2014.01) | |
| *A63F 13/60* | (2014.01) | |
| *A63F 13/63* | (2014.01) | |
| *A63F 13/822* | (2014.01) | |

(52) U.S. Cl.

CPC .............. *A63F 13/63* (2014.09); *A63F 13/69* (2014.09); *A63F 13/822* (2014.09)

(56) References Cited

U.S. PATENT DOCUMENTS

| | | | |
|---|---|---|---|
| 11,656,755 B2 | 5/2023 | Pan et al. | |
| 11,819,763 B2 | 11/2023 | Liu | |
| 12,023,583 B2 | 7/2024 | Qui et al. | |
| 2020/0316472 A1 | 10/2020 | Hu | |
| 2020/0346113 A1 | 11/2020 | Sun | |
| 2021/0052983 A1* | 2/2021 | Laatikainen | .......... A63F 13/525 |
| 2022/0040574 A1 | 2/2022 | Li | |
| 2022/0125201 A1 | 4/2022 | Lapointe et al. | |

FOREIGN PATENT DOCUMENTS

| | | | | |
|---|---|---|---|---|
| CN | | 107930120 A | 4/2018 | |
| CN | | 108888956 A | 11/2018 | |
| CN | | 110694273 A | 1/2020 | |
| CN | | 111111181 A | 5/2020 | |
| CN | | 111249730 A | 6/2020 | |
| CN | | 111589136 A | 8/2020 | |
| CN | | 112675544 A | 4/2021 | |
| WO | WO 2018/104921 A1 | | 6/2018 | |
| WO | WO 2020/024806 A1 | | 2/2019 | |
| WO | WO 2019/179294 A1 | | 9/2019 | |
| WO | WO 2020/029817 A1 | | 2/2020 | |
| WO | WO-2020052421 A1 * | | 3/2020 | ........... H04N 21/485 |
| WO | WO 2020/119447 A1 | | 6/2020 | |
| WO | WO 2020/244415 A1 | | 12/2020 | |

OTHER PUBLICATIONS

"Ranking Every Airdrop Reward in PUBG From Worst to Best!" published Mar. 20, 2019. Source: https://www.youtube.com/watch?v= TNanYIBIGQE (Year: 2019).*

"How to Guides—Rust Guide—IGN" published Feb. 27, 2017. Source: https://www.ign.com/wikis/rust (Year: 2017).*

"How to use Betterloot Plugin Tutorial," published Mar. 20, 2020. Source: https://www.youtube.com/watch?v=X7KxnfecX_w (Year: 2020).*

"Better Loot. A complete re-implementation of the drop system." Published Sep. 15, 2019. source: https://web.archive.org/web/20190815103346/https://umod.org/plugins/better-loot (Year: 2019).*

"Fancy Drop. The all-in-one airdrop toolset." Published Aug. 15, 2019. Source: https://web.archive.org/web/20190815103347/https://umod.org/plugins/fancy-drop (Year: 2019).*

"Rust Enable Twitch Drops. New Guide." Published Nov. 12, 2020. Source: https://www.youtube.com/watch?v=5zfzGMWm110 (Year: 2020).*

Office Action and Search Report issued for corresponding application No. CN 202011614714.3 dated Oct. 25, 2022, 9p, in Chinese language.

English language translation of Office Action issued for corresponding application No. CN 202011614714.3 dated Oct. 25, 2022, 8p.

"News Bulletin" found at https://www.jixunisg.com/Home/News/article/id/1779, printed on Dec. 7, 2022, 3p, in Chinese language.

"How to Use Call of Duty 16 battle royale configuration", found at https://ingyan.baidu.com/article/8ebacdf0e5667108165cd5b6.html, printed on Dec. 7, 2022, 2p, in Chinese language.

Form PCT/ISA/220 (PCT/ISA/220) issued for priority application No. PCT/CN2021/137774 dated Mar. 9, 2022, 1p, in Chinese language.

PCT/US2022/080844 application as filed in the USPTO Patent Cooperation Treaty Receiving Office on Dec. 2, 2022, 85p.

International Search Report (PCT/ISA/210) issued in PCT Application No. PCT/CN2021/137774 dated Mar. 9, 2022 (four (4) pages).

Chinese-language Written Opinion (PCT/ISA/237) issued in PCT Application No. PCT/CN2021/137774 dated Mar. 9, 2022 (five (5) pages).

Office Action issued in Japanese Patent Application No. 2023-527727 dated May 29, 2024 w/English translation, 10 pages.

* cited by examiner

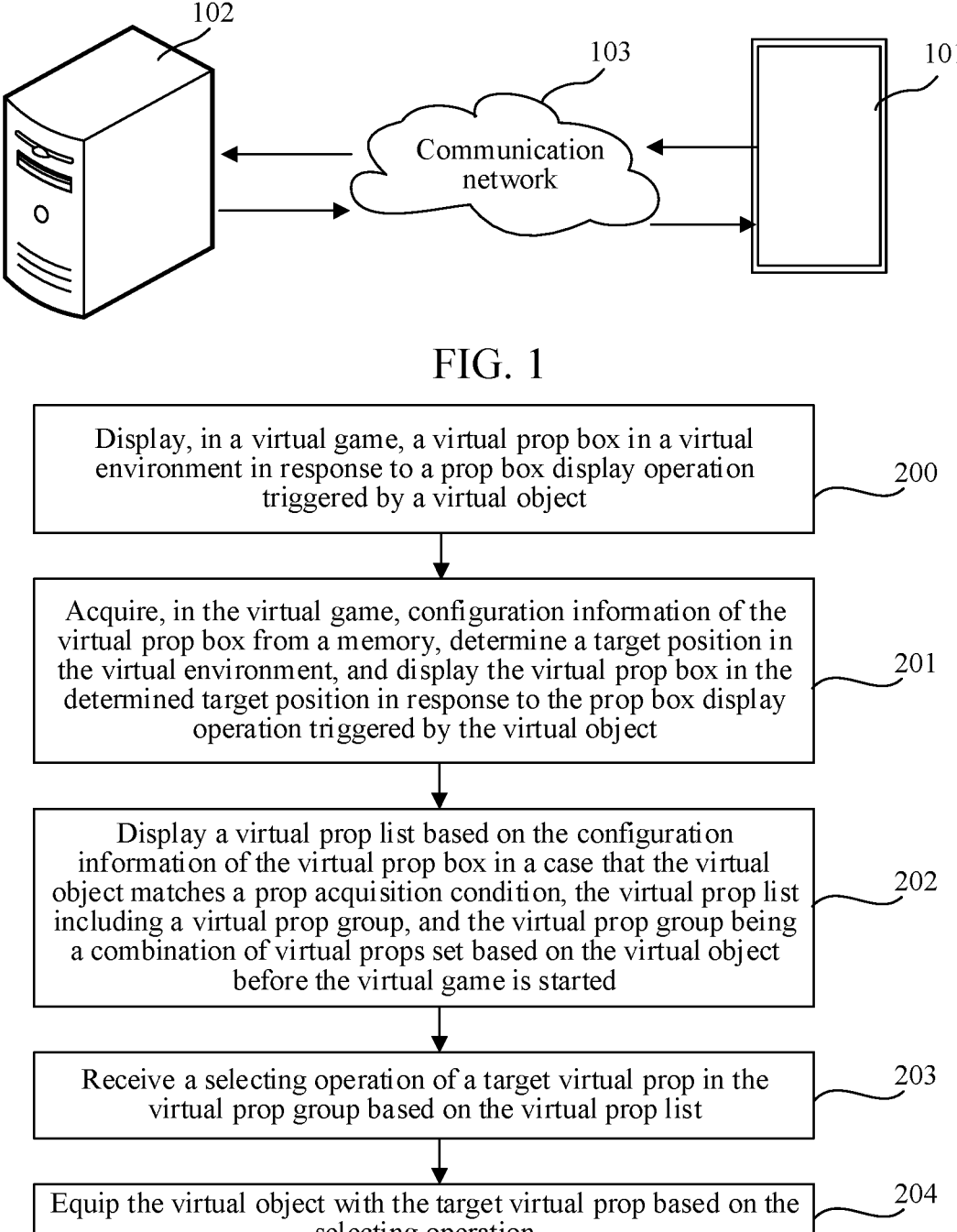

FIG. 1

Display, in a virtual game, a virtual prop box in a virtual environment in response to a prop box display operation triggered by a virtual object — 200

Acquire, in the virtual game, configuration information of the virtual prop box from a memory, determine a target position in the virtual environment, and display the virtual prop box in the determined target position in response to the prop box display operation triggered by the virtual object — 201

Display a virtual prop list based on the configuration information of the virtual prop box in a case that the virtual object matches a prop acquisition condition, the virtual prop list including a virtual prop group, and the virtual prop group being a combination of virtual props set based on the virtual object before the virtual game is started — 202

Receive a selecting operation of a target virtual prop in the virtual prop group based on the virtual prop list — 203

Equip the virtual object with the target virtual prop based on the selecting operation — 204

FIG. 2

Receive a triggering operation for the virtual prop box ⟋ 501

↓

Display an account number prop list ⟋ 502

↓

Display a virtual accessory list corresponding to a target virtual firearm in response to reception of a selecting operation for the target virtual firearm ⟋ 503

↓

Perform virtual accessory configuration on the target virtual firearm to determine a target accessory collocation in response to reception of a selecting operation for a virtual accessory in the virtual accessory list ⟋ 504

↓

Determine the target virtual firearm and the target accessory collocation as a target virtual prop group ⟋ 505

FIG. 5

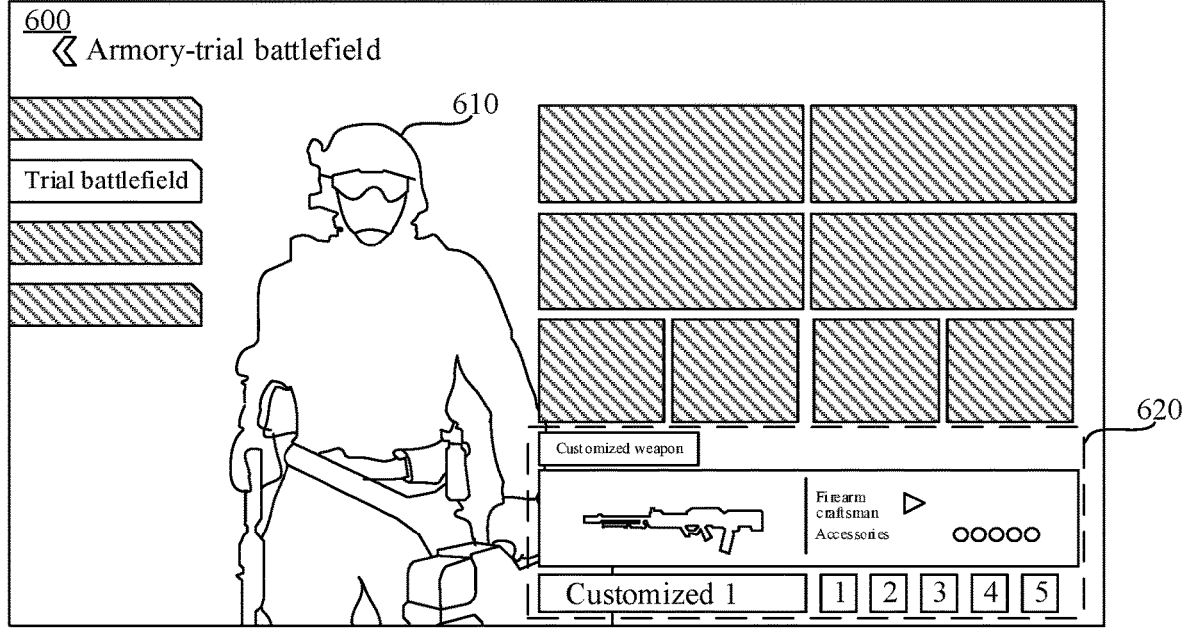

FIG. 6

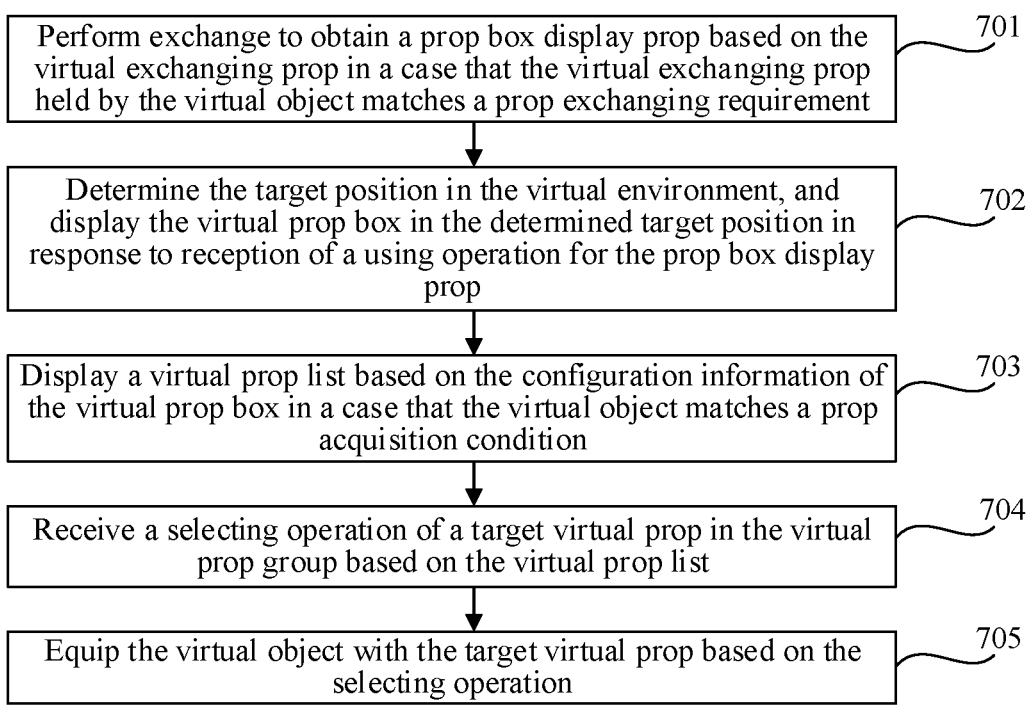

Perform exchange to obtain a prop box display prop based on the virtual exchanging prop in a case that the virtual exchanging prop held by the virtual object matches a prop exchanging requirement ⎯ 701

Determine the target position in the virtual environment, and display the virtual prop box in the determined target position in response to reception of a using operation for the prop box display prop ⎯ 702

Display a virtual prop list based on the configuration information of the virtual prop box in a case that the virtual object matches a prop acquisition condition ⎯ 703

Receive a selecting operation of a target virtual prop in the virtual prop group based on the virtual prop list ⎯ 704

Equip the virtual object with the target virtual prop based on the selecting operation ⎯ 705

FIG. 7

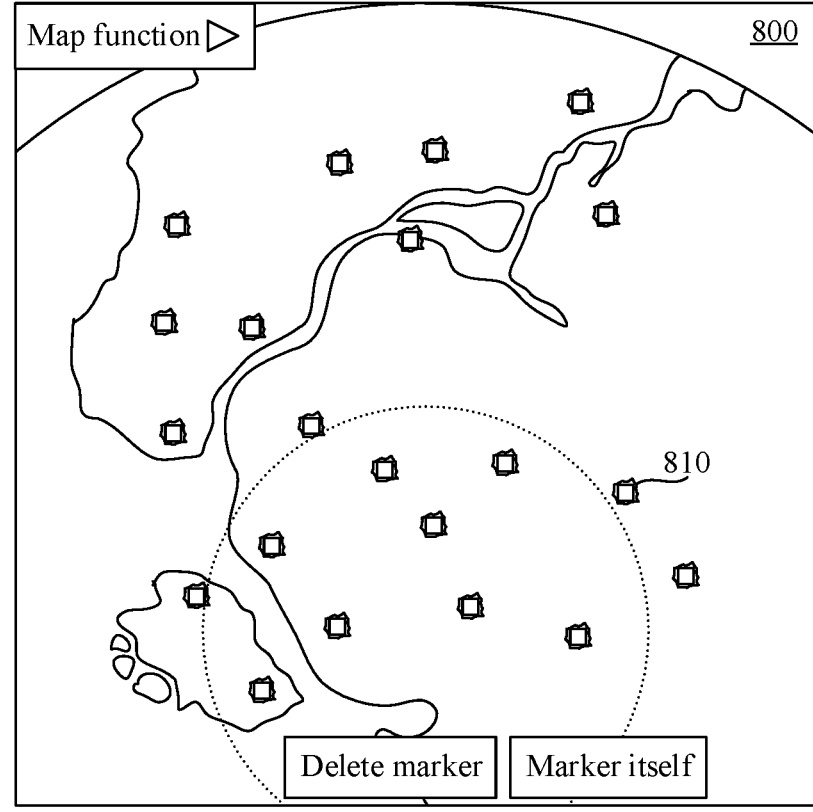

Map function ▷                    800

810

Delete marker    Marker itself

FIG. 8

METHOD AND APPARATUS FOR CONTROLLING HUMAN-COMPUTER INTERACTION INTERFACE, DEVICE, AND MEDIUM

RELATED APPLICATION

This application is a continuation of PCT application PCT/CN2021/137774 filed Dec. 14, 2021, which claims priority to Chinese Patent Application No. 202011614714.3, entitled "METHOD, APPARATUS, AND DEVICE FOR OBTAINING VIRTUAL PROPS AND MEDIUM" and filed on Dec. 30, 2020, which is incorporated herein by reference in its entirety.

FIELD OF THE TECHNOLOGY

The present subject matter relates to the field of computer technologies, and in particular, to a method, apparatus, and device for controlling a human-computer interaction interface.

BACKGROUND

In a battle royale (BR) game application program including a virtual environment, virtual objects corresponding to players are configured in the virtual environment. The virtual objects in a game may be controlled by the players to battle according to certain game rules, and when the game satisfies certain conditions, the players win victory of the game.

In an ongoing process of the BR game, the players may operate the virtual objects to pick up virtual props from the virtual environment, for example, virtual weapon props, virtual accessory props, virtual knapsack props, virtual drug props and the like. The players may use these picked virtual props to win the final victory of the game. However, the virtual props in the virtual environment are fixed, and all the virtual objects in the virtual environment may acquire the virtual props existing in the virtual environment.

BRIEF SUMMARY

Examples of the present subject matter provide a method and apparatus for controlling a human-computer interaction interface, a device and a medium. A virtual prop container may be preset before a game, configuration information of the virtual prop container may be generated and stored, and in the game, a user controls a certain position determined by a virtual object, reads the stored configuration information, and starts a target virtual prop in the virtual prop container. As the target virtual prop may not be started by the virtual object at the beginning of the game, a server and a terminal do not need to continuously update and process data related to the target virtual prop along with movement of the virtual object in the game before the virtual object starts the target virtual prop, so that the virtual object may use the target virtual prop configured by the user himself/herself under a circumstance of not excessively increasing operations and storage of the server and the terminal and a pressure of network transmission. The technical solution may be as follows:

In a first aspect, a method for controlling a human-computer interaction interface may be provided, the method including: receiving, before a virtual game session is started, a setting operation of a virtual prop container, generating configuration information of the virtual prop container according to the received setting operation of the virtual prop container, and storing the configuration information of the virtual prop container in a memory; acquiring, in the virtual game session, the configuration information of the virtual prop container from the memory, determining a target position in a virtual environment, and displaying the virtual prop container in the determined target position in response to a prop box display operation triggered by a virtual object; displaying a virtual prop list based on the configuration information of the virtual prop container in a case that the virtual object matches a prop acquisition condition, receiving a selection of a target virtual prop in the virtual prop list; and granting the virtual object with the target virtual prop based on the selection.

In another aspect, an apparatus for controlling a human-computer interaction interface is provided, the apparatus including: a receiving module, configured to receive, before a virtual game session is started, a setting operation of a virtual prop container, generate configuration information of the virtual prop container according to the received setting operation of the virtual prop container, and store the configuration information of the virtual prop container in a memory; a display module, configured to acquire, in the virtual game session, the configuration information of the virtual prop container from the memory, determine a target position in a virtual environment, and display the virtual prop container in the determined target position in response to a prop box display operation triggered by a virtual object, the display module being further configured to display a virtual prop list based on the configuration information of the virtual prop container in a case that the virtual object matches a prop acquisition condition, and the receiving module being further configured to receive a selection of a target virtual prop in the virtual prop list; and an acquisition module, configured to equip the virtual object with the target virtual prop based on the selection.

According to another aspect, a computer device is provided, including a processor and a memory, the memory storing at least one instruction, at least one segment of program, a code set, or an instruction set, the at least one instruction, the at least one segment of program, the code set, or the instruction set being loaded and executed by the processor to implement the method for controlling a human-computer interaction interface according to any one of the foregoing examples of the present subject matter.

According to another aspect, a computer-readable storage medium may be provided, storing at least one segment of program code, the at least one segment of program code being loaded and executed by a processor, to implement the method for controlling a human-computer interaction interface according to any one of the foregoing examples of the present subject matter.

According to another aspect, a computer program product or a computer program may be provided, the computer program product or the computer program including computer instructions, the computer instructions being stored in a computer-readable storage medium. A processor of a computer device reads the computer instructions from the computer-readable storage medium, and executes the computer instructions, to cause the computer device to implement the method for controlling a human-computer interaction interface according to any one of the foregoing examples of the present subject matter.

BRIEF DESCRIPTION OF THE DRAWINGS

To describe the technical solutions in the examples of the present subject matter more clearly, the following briefly introduces the accompanying drawings required for describing the examples. Apparently, the accompanying drawings in the following description show only some examples of the present subject matter, and a person of ordinary skill in the art may still derive other accompanying drawings from the accompanying drawings without creative efforts.

FIG. 1 is a schematic diagram of an implementation environment according to an example of the present subject matter.

FIG. 2 is a flowchart of a method for controlling a human-computer interaction interface provided by an example of the present subject matter.

FIG. 5 is a flowchart of setting a virtual prop group based on a virtual object before a virtual game session is started provided by an example of the present subject matter.

FIG. 6 is a schematic diagram of an armory interface provided by an example of the present subject matter.

FIG. 7 is a flowchart of a method for controlling a human-computer interaction interface provided by another example of the present subject matter.

FIG. 8 is a schematic diagram of a virtual map provided by an example of the present subject matter.

DETAILED DESCRIPTION

Figure 3:
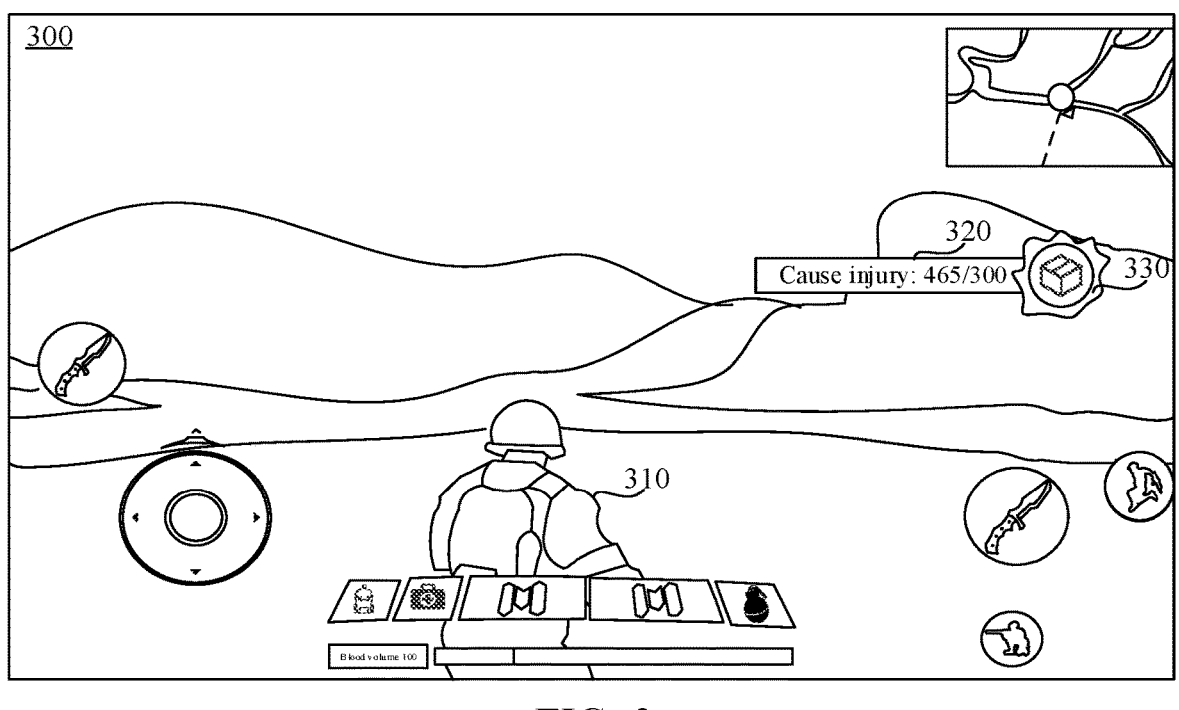
FIG. 3 is a schematic diagram of a virtual environment interface provided by an example of the present subject matter.

To make the objectives, technical solutions, and advantages of the present subject matter clearer, the following further describes implementations of the present subject matter in detail with reference to the accompanying drawings.

First, terms involved in the examples of the present subject matter are briefly introduced.

As used herein, a virtual environment may be displayed (or provided) by an application program when run on a terminal. The virtual environment refers to a simulated environment of a real world, or may be a semi-simulated and semi-fictional environment, or may be a completely fictional environment. The virtual environment may be any one of a two-dimensional virtual environment, a 2.5-dimensional virtual environment, or a three-dimensional virtual environment. This may not be limited in the present subject matter. A description may be made by using an example in which the virtual environment may be a three-dimensional virtual environment in the following examples.

As used herein, a virtual object refers to a movable object in a virtual environment. The movable object may be a virtual character, a virtual animal, a cartoon character, or the like, such as a character, an animal, a plant, an oil drum, a wall, or a stone displayed in a three-dimensional virtual environment. In an implementation, the virtual object may be a three-dimensional model created based on a skeletal animation technology. Each virtual object has a shape and size in the three-dimensional virtual environment, and occupies some space in the three-dimensional virtual environment.

As used herein, a virtual game session refers to a game in which at least two virtual objects compete in a virtual environment. In an implementation, the virtual game session may be a single battle game where at least two virtual objects battle each other. Each round of a virtual battle corresponds to one battle duration/a number of people in battle. When the virtual battle corresponds to the battle duration, a virtual object of which a survival duration reaches the battle duration wins a victory; When a virtual firearm battle corresponds to the number of combatants, the last survived virtual object or the last group of survived virtual objects win victory. In an implementation, the virtual game session may be a virtual game session in a single player matched mode (i.e., all the virtual objects in the virtual game session play solo), a virtual game session in a double player matched mode (i.e., the virtual objects in the virtual game session may be either a two player team to play or play solo) or a virtual game session in a four player matched mode (i.e., at most four virtual objects may form a team to play in the virtual game session). When the matched mode may be the double player matched mode or the four player matched mode, a first virtual object may be matched with either a second virtual object with a friendship or a third virtual object without a friendship.

As used herein, a virtual prop refers to a prop capable of being used by the virtual object in the virtual environment. The virtual prop may include an attack prop, an accessory prop, a medical drug prop and the like.

As used herein, an attack prop refers to a prop held or arranged by the virtual object in the virtual environment for attacking other virtual objects. In an implementation, the attack prop may further be divided into a long-range attack prop, a short-range attack props and a delay attack prop. The long-range attack prop refers to a prop that launches emissions to realize an attack process, where the emissions may be emitted by the prop itself such as virtual firearms, and virtual bows and arrows, and may also be the attack prop itself such as pebbles and sand bags. The short-range attack prop refers to a prop, a waving mode of which may be directly controlled by the virtual object to realize an attack process, for example, a virtual tool, a virtual stick, a virtual pan and the like. The delay attack prop refers to, after setting the attack prop, triggering attack to the virtual object after reaching a triggering condition of the attack prop. In an implementation, the triggering condition may be either a time condition or an operating condition.

As used herein, an accessory prop refers to a virtual prop for assembling the virtual firearm equipped for the virtual object, for example, a virtual prop such as a muzzle, a grip, a cartridge holder, a gunstock and a sighting telescope. For example, each virtual gun may be provided with at least one slot for fitting at least one accessory prop. The virtual firearm may include an automatic rifle, a sniper rifle, a shotgun, a pistol, a sub-machine gun and the like. The muzzle, the grip, the cartridge holder, the gunstock and the sighting telescope correspond to the virtual firearms of different types or the virtual firearms of different types are different, too, for example, the gunstock assembled on an M16A4 automatic rifle cannot be used in other virtual firearms.

As used herein, a medical drug prop refers to a virtual prop capable of restoring a health point or energy of the virtual object. In an implementation, the medical drug prop may include at least one of a medical kit, a medical pack, a bandage, a sports beverage, a painkiller, or epinephrine. The medical kit, the medical pack and the bandage may restore the health point of the virtual object, and the sports beverage, the painkiller and the epinephrine may restore the energy value of the virtual object.

As used herein, a virtual prop container refers to a container or storage element for the virtual object to acquire the virtual props in the virtual environment. In an implementation, the virtual prop container may be an airdrop box which may be either a container body for delivering the virtual props to the virtual object in the virtual environment or a container body thrown by a virtual airplane flying over the sky of the virtual environment to the ground of the virtual environment. The virtual prop container may take the form of a variety of two- and three-dimensional shapes, including a box, sphere, pyramid, and the like. The virtual prop container may also be a prop container arranged in a predetermined position in the virtual environment, for example, a virtual vending machine, a virtual prop capsule, virtual storehouse, virtual garage, virtual shed, and the like. The virtual object may acquire the virtual props by interacting with the above-mentioned prop container, or the virtual object may acquire the virtual props by destroying the above-mentioned prop container. Schematically, the virtual props in the virtual prop container are props having a gain, loss, beneficial, detrimental, and/or supplemental effect to a battle process of the virtual object.

As used herein, an armory refers to a virtual arsenal of an account number corresponding to the virtual object. The virtual props corresponding to the account number are collected in the armory. Schematically, through the account number, virtual currency may be exchanged in a virtual mall to obtain the virtual props, and the above-mentioned exchanged virtual props are collected in the armory of the account number. Through the account number, the virtual props capable of being collected in the armory may be acquired by satisfying an acquisition condition. For example, the account number level meets the requirements of a target level, a system automatically collects a certain virtual prop to the corresponding armory.

As used herein, the prop acquisition condition refers to a condition, through which the virtual object may acquire the virtual props from the virtual prop container. Schematically, the prop acquisition condition may be as follows: whether a distance between the virtual object and the virtual prop container may be within a predetermined distance range, or whether the virtual object has a certain quantity of virtual resources.

Second, an implementation environment of the examples of the present subject matter may be introduced in combination with the above-mentioned explanation of nouns.

Referring to FIG. 1, the implementation environment may include a terminal 101, a server cluster 102, and a communication network 103.

The terminal 101 may be a desktop computer, a portable laptop computer, a mobile phone, a tablet computer, an eBook reader, a Moving Picture Experts Group Audio Layer III (MP3) player, a Moving Picture Experts Group Audio Layer IV (MP4) player, or the like. An application program supporting a virtual environment may be installed and run on the terminal 101, such as an application program supporting a three-dimensional virtual environment. The APP may be any one of a virtual reality APP, a three-dimensional map program, a third-person shooter (TPS) game, a first-person shooter (FPS) game, a MOBA game, and a multi-player gunfight survival game. In an implementation, the application program may be a standalone application program, such as a standalone 3D game program, or may be a network online application program.

The server 102 may include at least one of one server, a plurality of servers, a cloud computing platform, or a virtualization center. The server 102 may be configured to provide background services for the application program supporting a three-dimensional virtual environment. Optionally, the server 102 undertakes the primary computing work, and the terminal 101 undertakes the secondary computing work. Alternatively, the server 102 undertakes the secondary computing work, and the terminal 101 undertakes the primary computing work. Alternatively, the server 102 and the terminal 101 perform collaborative computing based on a distributed computing architecture.

The user may control the virtual object in the application program that supports the virtual environment through the terminal 101, namely, the user may control the virtual object to join in the virtual game session and participate in a confrontation game in the virtual environment corresponding to the virtual game session. The terminal 101 transmits a signal corresponding to a user operation to the server 102 through the communication network 103, and the server 102 performs corresponding logical processing and returns a processing result to the terminal 101. Those skilled in the art may know that the number of the above terminals 101 may be more. For example, there may be only one terminal 101, or there may be dozens of or hundreds of terminals 101 or more. This example of the present subject matter does not limit the quantity and device type of the terminals 101.

Before the virtual game session may be started, the terminal 101 receives a setting operation of the virtual prop container. The terminal 101 generates configuration information of the virtual prop container according to the setting operation, and uploads the configuration information to the server 102. After receiving the above-mentioned configuration information, the server 102 stores the configuration information and an account number identifier corresponding to the terminal 101. In the virtual game session, when the terminal 101 needs to generate the virtual prop container in the virtual environment, the server 102 will determine a corresponding virtual prop group in the virtual prop container according to the above-mentioned configuration information, and returns corresponding prop information to the terminal 101. The terminal 101 displays the virtual prop container in the virtual environment according to the prop information.

An application scenario of the examples of the present subject matter may be introduced in combination with the above-mentioned explanation of nouns and the implementation environment.

In related art, a competitive program (or a competitive application program) may be automatically set to periodically throw the virtual prop container to the ground in the virtual environment through the virtual airplane. The user may operate the virtual object to move to a drop point of the virtual prop container and to interact with the virtual prop container within the predetermined distance range from the drop point, to acquire the virtual props from the virtual prop container. The virtual props existing in the box body of the virtual prop container are props randomly selected in a predetermined virtual prop list. The virtual props may be selected from a virtual prop library containing an array of virtual props, such as all props usable within the virtual game session, for example. For example, the predetermined virtual prop list may include an AWM sniper rifle, an M249 machine gun, an AUG assault rifle, a GROZE assault rifle, an eight times scope, a sniper silencing barrel, a ghillie suit and a medical kit. In a virtual game session process, the competitive program randomly selects a predetermined quantity of virtual props from the above-mentioned virtual prop list, generates the virtual prop container and delivers the virtual prop container to the virtual environment. The size of the virtual prop list may be determined dynamically or fixed to a specific size. Virtual objects fight for the virtual prop container to acquire the virtual props in the virtual prop container. Under this circumstance, the virtual props in the virtual prop container are composed of the virtual props in a fixed virtual prop list and will not be changed as a result of different virtual objects that acquire the virtual prop container. A control mode of a human-computer interaction interface thereof may be single.

In the examples of the present subject matter, the user may participate in the virtual game session through the competitive program. The competitive program may be a game application program such as a MOBA game application program, a shooting game application program, a multi-player gunplay survival game application program and a Battle Royale survival game application program, which may not be limited in the examples of the present subject matter. The competitive program which may be the Battle Royale survival game application program may be taken as an example. A user may enter the armory (in form of an armory interface) in a lobby interface of the competitive program after using a target account number to log in the competitive program, and perform customized setting on the virtual props capable of being acquired in the virtual prop container, to obtain a virtual prop group. The virtual prop group may include at least one virtual prop. After completing setting of the virtual prop group in the armory and performing a storing operation, the user may start the virtual game session through a game start control in the lobby interface, and the virtual object enters the virtual environment to participate in the virtual game session. In the game process of the virtual game session, when the virtual object operated by the user satisfies a certain triggering condition, the virtual prop container will be displayed in the virtual environment. In an implementation, the virtual object may acquire a virtual call prop in the virtual environment and call the virtual prop container through the virtual call prop. In another implementation, the virtual object may exchange the virtual prop container through a virtual resource acquired in the virtual environment in a predetermined location in the virtual environment. The virtual object may acquire the target virtual prop through the virtual prop container. The target virtual prop may be a virtual prop in the virtual prop group set by the user in the armory before the virtual game session may be started.

Referring to FIG. 2, it illustrates a flowchart of a method for controlling a human-computer interaction interface provided by an example of the present subject matter. The method for controlling a human-computer interaction interface provided by an example of the present subject matter may be described in combination of FIG. 2 and the above-mentioned application scenario. The example may be described by applying the method to the terminal. The method may include the following steps:

Step S200: Receive, before a virtual game session may be started, a setting operation of a virtual prop container, generate configuration information of the virtual prop container according to the received setting operation of the virtual prop container, and store the configuration information of the virtual prop container in a memory.

Step S201: Acquire, in the virtual game session, the configuration information of the virtual prop container from the memory, determine a target position in a virtual environment, and display the virtual prop container in the determined target position in response to a prop box display operation triggered by a virtual object.

In the examples of the present subject matter, the virtual environment may be provided by the competitive application program. The user may use a target account number to log in the competitive application program and control the virtual object to participate in the virtual game session. The virtual environment corresponds to the virtual game session. The virtual environment may be used for providing an operating environment of the virtual game session. The virtual object corresponding to the target account number participates in the virtual game session in the virtual environment.

The terminal displays a virtual environment interface controlled by the target account number. In the virtual game session, the virtual environment interface may include a picture through which the virtual object observes the virtual environment. Schematically, the picture may be either a picture displayed from a first-person perspective of the virtual object or a picture displayed from a third-person perspective of the virtual object. The first-person perspective may be a perspective corresponding to the picture capable of being observed by the virtual object in the virtual environment. The picture corresponding to the first-person perspective excludes the virtual object itself. The third-person perspective may be a perspective through which the virtual object may be observed through a camera model in the virtual environment. The picture corresponding to the third-person perspective may include the virtual object itself, and the camera model may be usually located behind the virtual object to observe the virtual object. The user may use the terminal to control the virtual object in the virtual environment to perform activity. The activity may include, but may not be limited to, at least one of adjusting body postures, crawling, walking, running, riding, jumping, driving, picking, shooting, attacking, or throwing. For example, the virtual object may be a simulated character role or a cartoon character role.

When the virtual object corresponding to the target account number satisfies a certain triggering condition (for example, trigger a prop box display operation), the virtual prop container will be displayed in the virtual environment.

In an implementation, the triggering condition may be that the virtual object acquires a virtual call prop and performs a calling operation on the virtual prop container in the virtual environment through the virtual call prop. Schematically, the virtual object may pick up the virtual call prop in the virtual environment. The virtual call prop which may be a signal gun may be taken as an example. The competitive application program may set the signal gun to be randomly refreshed or appear in any position or a predetermined position in the virtual environment, and the user may operate the virtual object to search for and pick up the signal gun in the virtual environment. When the virtual object acquires the signal gun, the user may operate the virtual object to use the signal gun to call the virtual prop container through the signal gun.

In an implementation, the triggering condition may be that the virtual object acquires a target quantity of virtual exchanging props in the virtual environment and displays the virtual prop container by using the virtual exchanging props. Under this circumstance, in response to reception of the prop box exchanging operation of the virtual object and in a case that the virtual exchanging props held by the virtual object meets prop exchanging requirements, the terminal displays the virtual prop container in the virtual environment. The virtual object may pick up the virtual exchanging props in the virtual environment. Schematically, the virtual exchanging props are refreshed virtual props set by the competitive application program in the virtual environment, and the virtual exchanging props may also be virtual props falling from other virtual objects when the user operates the virtual object to kill the other virtual objects. When the quantity of the virtual exchanging props acquired by the virtual object operated by the user reaches a target quantity, the virtual prop container may be displayed through the virtual exchanging props. Schematically, the call prop of the virtual prop container may be directly synthesized through the target quantity of the virtual exchanging props, or a permission to interact with the virtual prop container in the virtual environment may also be acquired through the target quantity of the virtual exchanging props. For example, the virtual exchanging props are virtual gold coins. When the virtual object picks up the virtual coins in the virtual environment, the user then may operate the virtual object to arrive at the virtual prop container in a certain fixed position in the virtual environment to interact with the virtual prop container. When the quantity of the virtual gold coins carried by the virtual object satisfies an interaction required quantity, a corresponding quantity of virtual gold coins may be deducted, and the virtual prop container may be in an interactive state. When the quantity of the virtual gold coins carried by the virtual object does not satisfy the interaction required quantity, the virtual prop container may be in a non-interactive state.

In an implementation, when the triggering condition may be that a role state of the virtual object satisfies the predetermined triggering condition, the virtual prop container may be displayed in the virtual environment. Schematically, the role state corresponds to at least one of a quantity of killed enemy virtual objects, or a total injury value to the enemy virtual objects. When the role state satisfies the predetermined triggering condition, the virtual environment interface corresponding to the virtual object will display a virtual prop container call control, and the user may display the virtual prop container by triggering the call control. In an example, referring to FIG. 3, the virtual environment interface 300 displays the virtual object 310 and prompt information 320 for prompting injury to the enemy virtual object caused by the virtual object 310. As shown in FIG. 3, the injury to the enemy virtual object caused by the virtual object 310 may be 465 points, which has satisfied the triggering condition for calling the virtual prop container. The virtual environment interface 300 will display a call control 330 in a triggerable state. The user may call and display the virtual prop container in the virtual environment by triggering the call control 330.

Schematically, the above-mentioned virtual prop container displayed under the certain triggering condition either may only be observed by the corresponding virtual object in the virtual environment or may be observed by any virtual object in the virtual environment.

The virtual prop container may also be displayed without satisfying the certain triggering condition. Namely, the virtual prop container may be located in a certain predetermined position or certain predetermined positions in the virtual environment, and the user only needs to search the virtual environment to find the above-mentioned virtual prop container, which may not be limited in the examples of the present subject matter.

Step S202: Display a virtual prop list based on the configuration information of the virtual prop container in a case that the virtual object matches a prop acquisition condition, the virtual prop list including a virtual prop group. The virtual prop group may be a combination of the virtual props set based on the virtual object before the virtual game session may be started.

When the virtual object meets the prop acquisition condition, the virtual object may interact with the virtual prop container and display the virtual prop list corresponding to the virtual prop container through the interacting operation. The virtual prop list may include a virtual prop group and the virtual prop group may include the target virtual prop. Schematically, the virtual prop in the virtual prop group may be one of an attack prop, an accessory prop and a medical drug prop or a combination of multiple props of the attack prop, the accessory prop and the medical drug prop.

Figure 4:
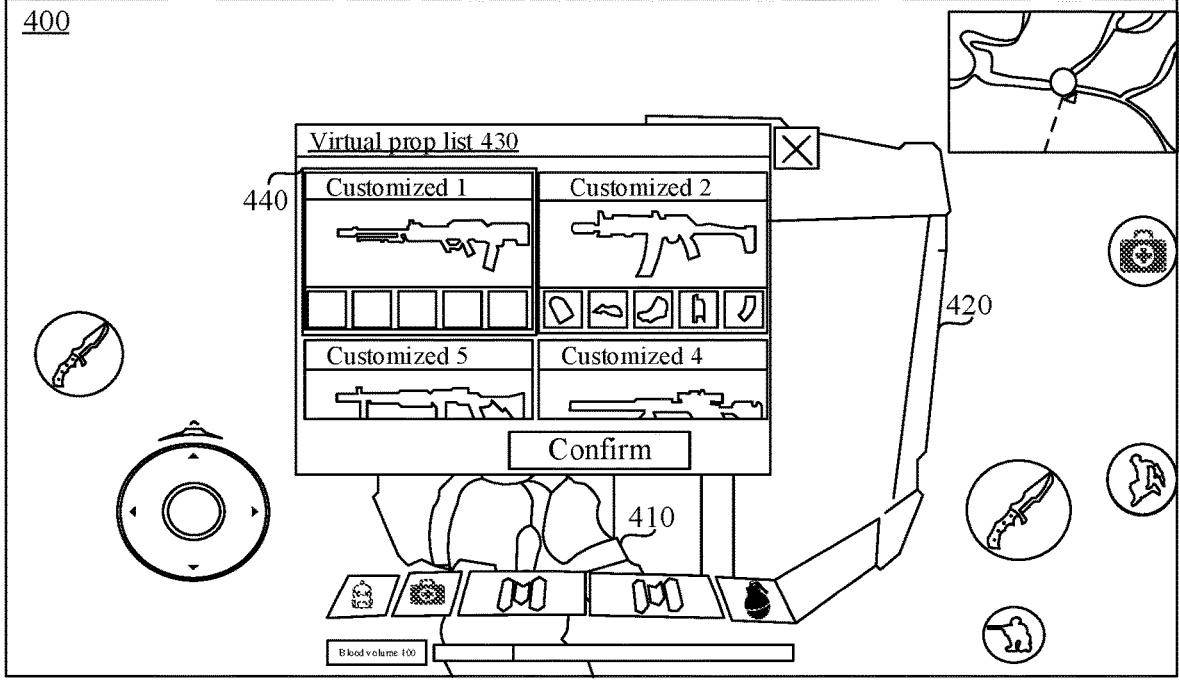
FIG. 4 is a schematic diagram of a virtual environment interface including a virtual prop list provided by an example of the present subject matter.

Referring to FIG. 4, a virtual environment interface 400 displays a virtual object 410 and a virtual prop container 420. After the virtual object 410 interacts with the virtual prop container 420, a corresponding virtual prop list 430 may be displayed. The virtual prop list 430 displays a plurality of virtual prop groups 440.

The prop acquisition condition may be as follows: whether a distance between the virtual object and the virtual prop container may be within a predetermined distance range. The terminal displays the virtual prop list based on the virtual prop container in a case that the distance between the virtual object and the virtual prop container may be within the predetermined distance range. For example, if a distance required range to interact with the virtual prop container may be within 3 meters, when the distance between the virtual object and the virtual prop container in the virtual environment may not be greater than 3 meters, the virtual object meets the prop acquisition condition. When the user operates the virtual object to interact with the virtual prop container, the virtual prop list may be displayed.

Schematically, the virtual object further holds the virtual resource correspondingly. The prop acquisition condition may also be that the virtual object needs to pay a certain quantity of virtual resources. In an example, the virtual object holds the virtual gold coins which may be picked up in the virtual environment or may be acquired by the virtual object killing the enemy virtual objects. When the virtual environment displays that there may be the virtual prop container, the virtual prop list may be displayed only by deducting a certain quantity of virtual gold coins when the virtual object interacts with the virtual prop container. Otherwise, when the virtual object interacts with the virtual prop container, a prompt that "the virtual prop container cannot be opened as a result of shortage of gold coins" will be displayed.

The virtual prop group may be a combination of the virtual props customized by the user based on the virtual object before the virtual game session may be started. Schematically, before the virtual game session may be started, the terminal receives the setting operation for the virtual prop container. The setting operation may be used for configuring the virtual prop list displayed by the virtual object through the virtual prop container in the virtual environment. The virtual prop group included by the virtual prop list may be determined based on the setting operation.

The target account number corresponding to the virtual object corresponds to an account number prop list, and the virtual props in the account number prop list have an incidence relationship with the target account number, namely the target account number has the virtual props in the above-mentioned account number prop list. Schematically, the target account number may purchase the virtual props by using the virtual resources. For example, the target account number spends virtual diamonds in the virtual mall to purchase the virtual props. The target account number may acquire the virtual props by satisfying a predetermined acquisition condition. For example, when the target account number level meets target level requirements, the system automatically gives a certain virtual prop to the account number prop list corresponding to the target account number. The purchased or acquired virtual prop has an incidence relationship with the target account number. In the setting process of the virtual prop group, in response to reception of the selection for the virtual prop in the account number prop list, the virtual prop group may be determined, namely, the virtual prop in the virtual prop group needs to have an incidence relationship with the target account number.

Step S203: Receive a selection of a target virtual prop in the virtual prop group based on the virtual prop list.

At least one virtual prop group may be displayed in the virtual prop list. The virtual prop group may be a combination of the virtual props customized by the user based on the virtual object before the virtual game session may be started. The combination may be either a single virtual prop such as a virtual firearm or a combination of various virtual props such as a virtual firearm equipped with a plurality of virtual accessories. The virtual prop group may include the target virtual prop. The selection for the virtual prop in the virtual prop list may be received, and the terminal determines the target virtual prop according to the selection.

Step S204: Equip the virtual object with the target virtual prop based on the selection.

The terminal controls the virtual object to acquire the target virtual prop after determining the target virtue prop according to the above-mentioned selection, equips the virtual object with the target virtual prop, and may use the target virtual prop. According to the examples of the present subject matter, the virtual object may be equipped with the target virtual prop. For example, data of the target virtual prop may be bound to the virtual object, and the state of the target virtual prop may be changed from being disabled to being enabled.

The virtual object only may acquire one virtual prop from the virtual prop container or the virtual object may acquire a plurality of virtual props from the virtual prop container. Schematically, when the virtual object may acquire the plurality of virtual props from the virtual prop container, the virtual object needs to consume different virtual resources for different virtual props. In an example, the quantity of the virtual resources consumed by the virtual object to acquire the attack prop may be larger than the quantity of the virtual resources consumed by the virtual object to acquire the medical drug prop.

In conclusion, according to the method for controlling a human-computer interaction interface provided by the examples of the present subject matter, the virtual prop container may be preset before the game, configuration information of the virtual prop container may be generated and stored, and in the game, the user controls a certain position determined by the virtual object, reads the stored configuration information, and starts the target virtual prop in the virtual prop container. As the target virtual prop may not be started by the virtual object at the beginning of the game, a server and a terminal do not need to continuously update and process data related to the target virtual prop along with movement of the virtual object in the game before the virtual object starts the target virtual prop, so that the virtual object may use the target virtual prop configured by the user himself/herself under a circumstance of not excessively increasing operations and storage of the server and the terminal and a pressure of network transmission.

Referring to FIG. 5, it illustrates a flowchart of setting the virtual prop group based on the virtual object before the virtual game session may be started in the examples of the present subject matter, where the virtual prop may include the virtual firearm. The method may include the following steps:

Step S501: Receive a trigger for the virtual prop container.

The user may enter the armory in a lobby interface after using the target account number to log in a competitive program on a terminal, and perform customized setting on the virtual props capable of being acquired in the virtual prop container, to obtain the virtual prop group. Referring to FIG. 6, it illustrates an armory interface 600. The armory interface 600 may include a virtual object 610 corresponding to the target account number and a virtual prop group customized setting module 620. The user may perform customized setting on the virtual prop acquired by the virtual object 610 from the virtual prop container through the virtual prop group customized setting module 620. The above-mentioned setting operation may be used for configuring the virtual prop list correspondingly displayed in the virtual prop container when the virtual object triggers the virtual prop container in the virtual environment, and the virtual prop group included in the virtual prop list may be determined through the setting operation.

Step S502: Display the account number prop list.

The target account number corresponding to the virtual object corresponds to the account number prop list, and the virtual prop in the account number prop list may include at least one virtual prop having an incidence relationship with a target account number corresponding to the virtual object. Schematically, the target account number may purchase the virtual props by using the virtual resources. For example, the target account number spends virtual diamonds in the virtual mall to purchase the virtual props. The target account number may acquire the virtual props by satisfying a predetermined acquisition condition. For example, when the target account number level meets target level requirements, the system automatically gives a certain virtual prop to the account number prop list corresponding to the target account number. The purchased or acquired virtual prop has an incidence relationship with the target account number. In the setting process of the virtual prop group, in response to reception of the selection for the virtual prop in the account number prop list, the virtual prop group may be determined, namely, the virtual prop in the virtual prop group needs to have an incidence relationship with the target account number.

When the user starts to configure the virtual prop group, the account number prop list may be displayed. The user may select the virtual props in the account number prop list.

In response to reception of the selection for the virtual prop in the account number prop list, the terminal determines the virtual prop group.

Step S503: Display a virtual accessory list corresponding to a target virtual firearm in response to reception of a selection for the target virtual firearm.

The account number prop list may include the target virtual firearm. When the user needs to take the virtual firearm as the virtual prop group in the virtual prop container, the user may further configure virtual accessories corresponding to the virtual firearm. When receiving the selection for the virtual firearm in the account number prop list, the terminal determines the target virtual firearm and displays the virtual accessory list corresponding to the target virtual firearm. Schematically, each of the virtual firearms may be provided with at least one virtual accessory The virtual accessories capable of being set by the virtual firearms of different firearm types or the virtual firearms of different firearm models are different either. Namely, when the target virtual firearms are different virtual firearms, the virtual accessories in the correspondingly displayed virtual accessory list are different either.

Step S504: Perform virtual accessory configuration on the target virtual firearm to determine a target accessory collocation in response to reception of a selection for a virtual accessory in the virtual accessory list.

The user may select the virtual accessories in the virtual accessory list and perform virtual accessory configuration on the target virtual firearm. For example, if the target virtual firearm may be an M416 assault rifle, an accessory slot capable of being customized may include a muzzle, a grip, a cartridge holder, a gunstock and a sighting telescope. In an example, the user selects a compensator, a vertical grip, a rapid expansion cartridge holder and a twofold sighting telescope in the virtual accessory list as the target accessory collocation of the M416 assault rifle. The terminal determines the target accessory collocation according to the selection of the user in the virtual accessory list.

Step S505: Determine the target virtual firearm and the target accessory collocation as a target virtual prop group.

In response to determination of the target accessory collocation, the above-mentioned target virtual firearm and its corresponding target accessory collocation are determined as one virtual prop group. Similarly, the user may configure a plurality of virtual prop groups by repeating the above-mentioned operation as the virtual props displayed in the virtual prop list in the virtual prop container in the virtual environment. The configured virtual prop groups will be included in the configuration information of the virtual prop container.

After completing the setting of the virtual prop groups, the user may operate the virtual object to enter the virtual game session. Schematically, in response to reception of a game start signal, the virtual object may be controlled to enter the virtual environment to participate in the virtual game session. The game start signal may be generated by either triggering a game start control in the lobby interface or triggering a shortcut key preset by the system, which may not be limited here.

In conclusion, according to the method for setting the virtual prop groups provided by the examples of the present subject matter, before the virtual game session may be started, the virtual prop groups are set based on the virtual object, and the user may further configure different virtual accessory collocations for different virtual firearms, thereby avoiding an invalid virtual prop group configuring operation generated in the virtual game session as the user attempts to match mismatched virtual accessories and virtual firearms and computing resources of the terminal and the server consumed therewith.

Referring to FIG. 7, it illustrates the method for controlling a human-computer interaction interface in the virtual environment in the examples of the present subject matter, where the virtual prop container may be displayed based on the virtual exchanging props. The method may include the following steps:

Step S701: Perform exchange to obtain a virtual box container summoning prop based on the virtual exchanging prop in a case that the virtual exchanging prop held by the virtual object matches a prop exchanging requirement.

In the examples of the present subject matter, the virtual object acquires the target quantity of virtual exchanging props in the virtual environment and displays the virtual prop container by using the virtual exchanging props. After acquiring the virtual exchanging props in the virtual environment, the virtual object performs exchange to obtain the virtual box container summoning prop through the virtual exchanging props, and the virtual object may display the virtual prop container in the virtual environment by using the virtual prop container display prop. That is, exchange may be performed to obtain the virtual box container summoning prop based on the virtual exchanging prop in a case that the virtual exchanging prop held by the virtual object matches a prop exchanging requirement. The virtual prop container may be displayed in the virtual environment in response to reception of a using operation for the virtual box container summoning prop.

Schematically, the virtual exchange props are picked up by the virtual object in the virtual environment. In an example, the virtual exchanging props are virtual gold coins distributed in the virtual environment. The virtual object may search the virtual environment and pick up the virtual gold coins. When the virtual gold coins held by the virtual object reach a target quantity, the virtual exchanging props may be subjected to an exchanging operation to acquire the virtual box container summoning prop.

In an implementation, the virtual box container summoning prop may be obtained by directly synthesizing the virtual exchanging props in a virtual knapsack associated with the virtual object. For example, after the virtual knapsack may be opened through a knapsack control in the virtual environment interface, the virtual exchanging props may be used. Namely, the target quantity of virtual exchanging props in the knapsack are directly synthesized to the virtual box container summoning prop.

In an implementation, the virtual exchanging props may be exchanged through a prop station set in the virtual environment. Schematically, the user may examine a distribution condition of the prop stations in the virtual environment through a virtual map. As shown in FIG. 8, a plurality of prop stations 810 are annotated in the virtual map 800. The user may determine the distribution condition of the prop stations 810 through the virtual map 800 and operate the virtual object to move to any prop station 810 to complete the exchanging operation of the virtual exchanging props.

Figure 9:
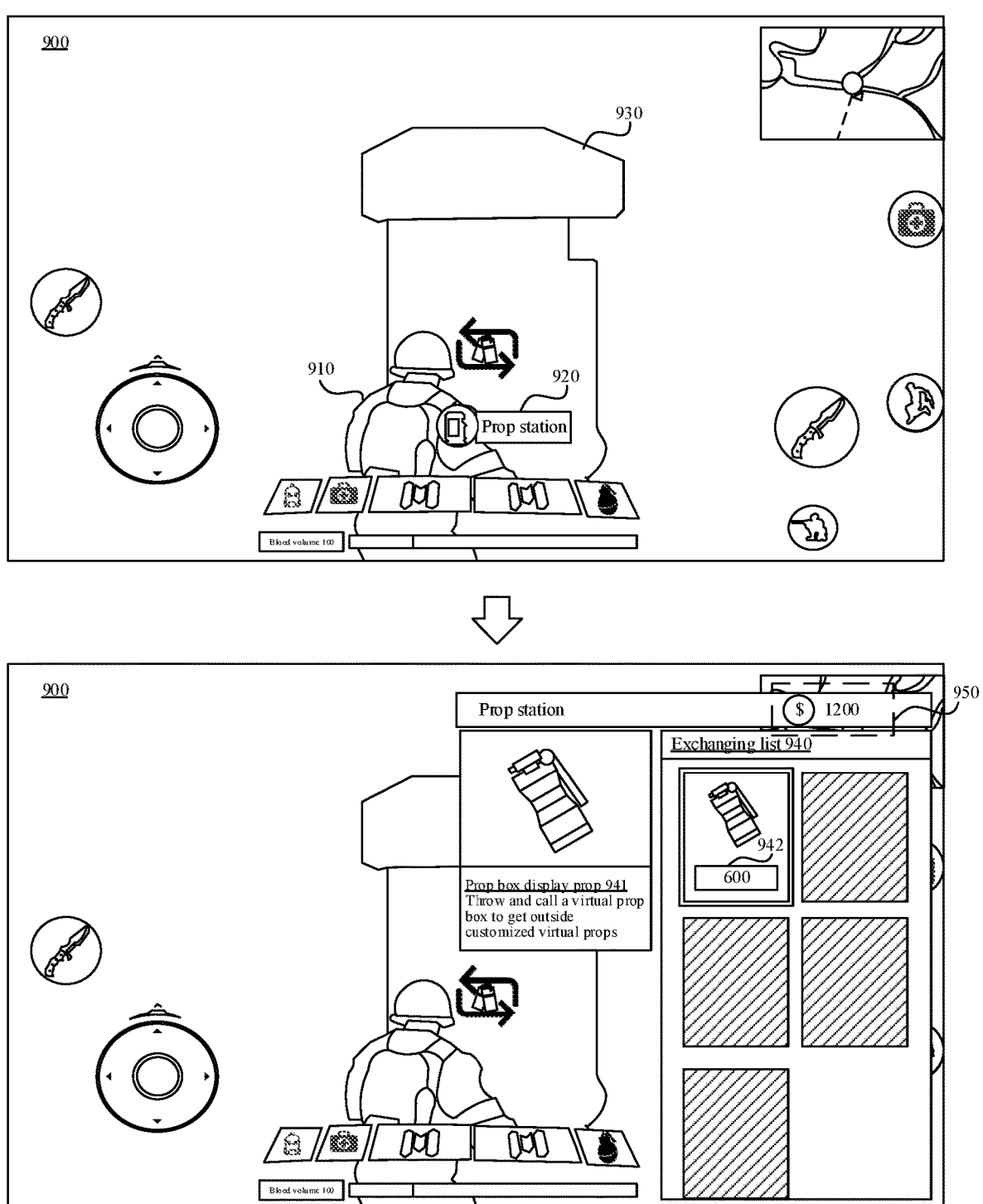
FIG. 9 is a schematic diagram of a virtual environment interface including a prop station provided by an example of the present subject matter.

When the user operates the virtual object to be close to the prop station, a target control that opens the prop station will be displayed. As shown in FIG. 9, a virtual environment interface 900 operated by the user displays a virtual object 910, a target control 920 and a prop station 930. The user may open an exchanging list 940 corresponding to the prop station through the trigger of the target control 920. The exchanging list 940 may include various exchanging props, including a virtual box container summoning prop 941. Meanwhile, the virtual environment interface 900 further displays the quantity 950 of the virtual exchanging props carried by the virtual object and a target quantity 942 of the virtual exchanging props needed to exchange the virtual box container summoning prop 941.

Step S702: Determine the target position in the virtual environment, and display the virtual prop container in the determined target position in response to reception of a using operation for the virtual box container summoning prop.

Figure 10:
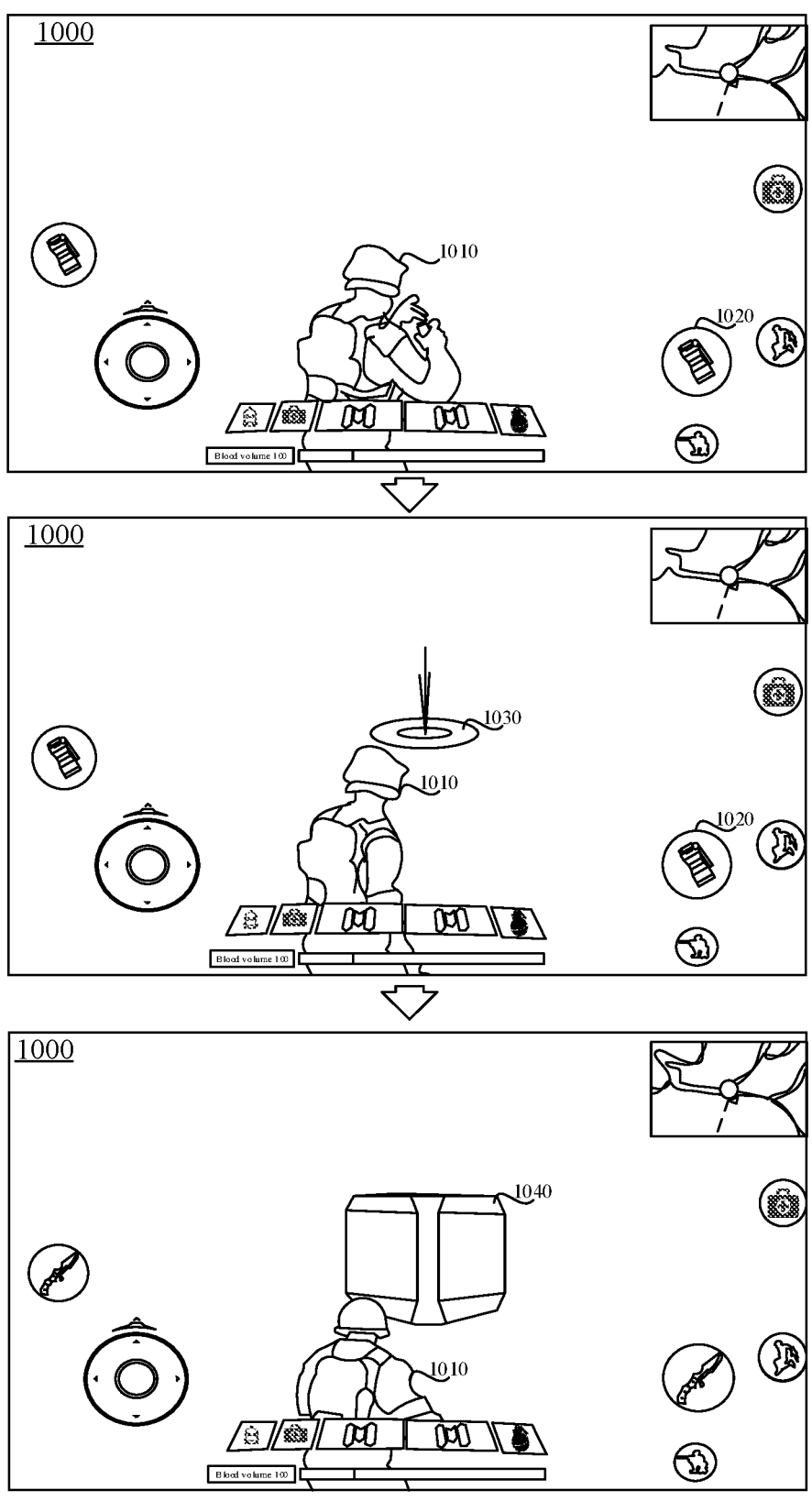
FIG. 10 is a schematic diagram of using a virtual box container summoning prop provided by an example of the present subject matter.

When the virtual object acquires the virtual box container summoning prop, the virtual prop container may be displayed in the virtual environment through the virtual box container summoning prop. Schematically, the virtual box container summoning prop may include various signal props such as a signal smoke prop. The virtual object may display the virtual prop container in the target position by throwing the signal smoke prop. Under this circumstance, the terminal receives the throwing operation of the virtual object for the signal prop. The target position in the virtual environment may be determined based on the throwing operation, and the virtual prop container may be displayed in the determined target position in the virtual environment. Namely, the virtual prop container may be displayed at the target position in the virtual environment in response to the throwing operation to throw the signal prop to the target position in the virtual environment. In an example, the virtual object throws the signal smoke prop to the target position, and there will be a virtual prop container appearing in form of airdrop above the target position. When the virtual prop container may be landed to the ground at the target position, the virtual object may interact with the virtual prop container. Referring to FIG. 10, a virtual environment interface 1000 may include a virtual object 1010 holding the signal smoke prop, and the virtual environment interface 1000 further displays a use control 1020 for the signal smoke prop. When the use control 1020 receives a trigger signal, a target position 1030 will appear in the virtual environment interface 1010. Namely, the signal smoke prop will be thrown to the target position 1030, and there will be a virtual prop container 1040 appearing in form of airdrop above the target position 1030. When the virtual prop container 1040 may be landed to the ground at the target position 1030, the user may operate the virtual object 1010 to move near the virtual prop container 1040 to interact with the virtual prop container 1040.

Step S703. Display a virtual prop list based on the configuration information of the virtual prop container in a case that the virtual object matches a prop acquisition condition.

When the virtual object meets the prop acquisition condition, the virtual object may interact with the virtual prop container and display the virtual prop list corresponding to the virtual prop container through the interacting operation. In the examples of the present subject matter, the prop acquisition condition may be as follows: whether a distance between the virtual object and the virtual prop container may be within a predetermined distance range. The virtual prop list may be displayed based on the configuration information of the virtual prop container in a case that the distance between the virtual object and the virtual prop container may be within the predetermined distance range.

Step S704: Receive a selection of a target virtual prop in the virtual prop group based on the virtual prop list.

The virtual prop list may include at least one virtual prop group. The virtual prop group may be a combination of the virtual props customized by the user based on the virtual object before the virtual game session may be started. The virtual prop group may include the target virtual prop to receive the selection for the virtual prop in the virtual prop list, and the terminal determines the target virtual prop according to the selection.

Step S705: Equip the virtual object with the target virtual prop based on the selection.

The terminal controls the virtual object to acquire the target virtual prop after determining the target virtue prop according to the selection, namely, equips the virtual object with the target virtual prop, and the terminal may use the target virtual prop.

In conclusion, according to the method for controlling a human-computer interaction interface provided by the examples of the present subject matter, the user may acquire the virtual exchanging props in the virtual environment, acquire the virtual box container summoning prop through the virtual exchanging props, calls the virtual prop container by the virtual box container summoning prop and acquire the target virtual prop through the virtual prop container. The target virtual prop may be the virtual prop in the virtual prop group set based on the virtual object before the virtual game session may be started. In the virtual game session, the target position in the virtual environment may be determined, and the virtual prop container may be displayed in the determined target position in response to reception of a using operation for the virtual box container summoning prop. Through interaction between the user and the virtual environment, on one hand, the user may control the time and the position of the virtual prop container appearing in the virtual environment more properly, and on the other hand, the user may control the position and the time to enable the target virtual prop pre-configured by the user in the virtual prop container more properly. Thus, the user may use a limited remaining time except the time needed for the game to determine the appearing positions of the virtual prop container and the target virtual prop without spending time to configure the target virtual prop to set the virtual prop container additionally. Therefore, a more reasonable probability of the appearing positions of the virtual prop container and the target virtual prop for human-computer interaction of the user in the game may be improved. For example, interference with the operation of the user for controlling a game role in a human-computer interaction interface may be avoided, thereby optimizing a human-computer interaction process.

Figure 11:
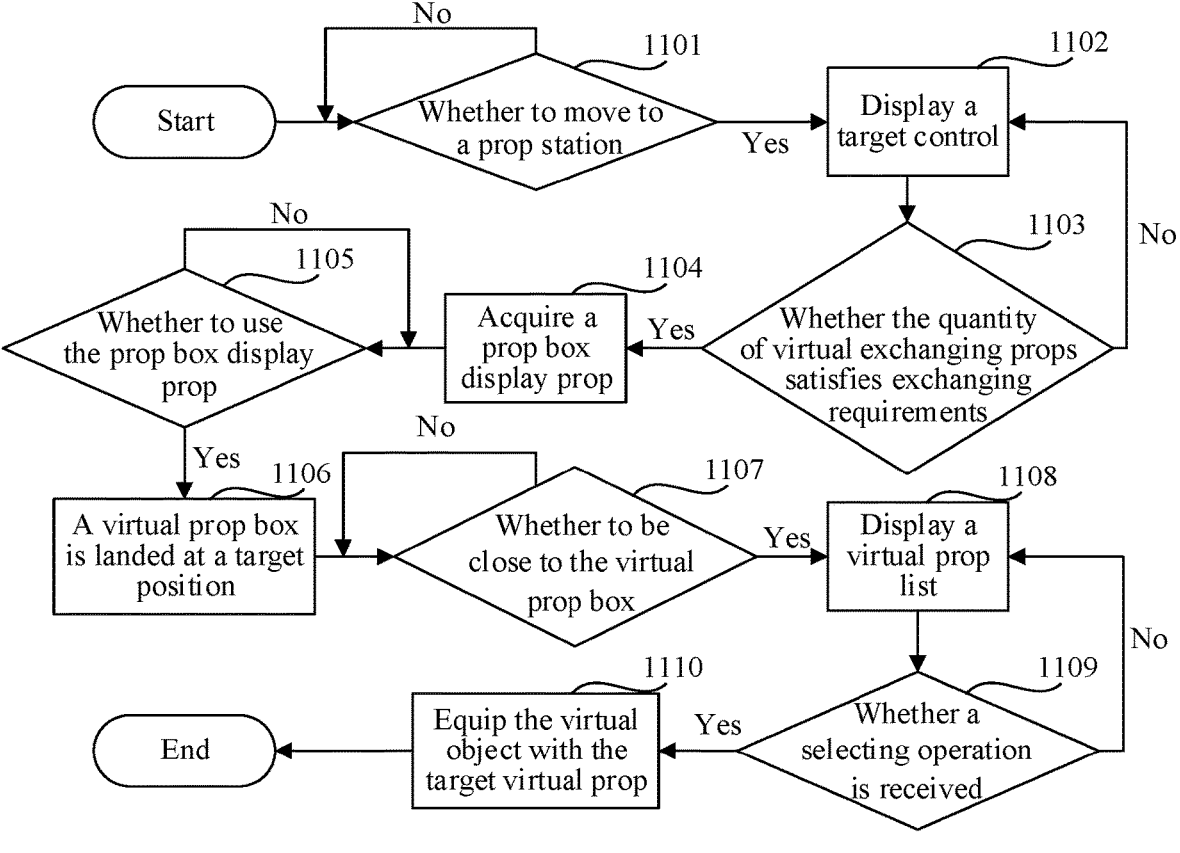
FIG. 11 is a flowchart of background logic provided by an example of the present subject matter.

Referring to FIG. 11, it illustrates a flowchart of background logic provided by the examples of the present subject matter. The flow may include the following steps:

Step S1101: Determine whether the virtual object moves to the prop station; if yes, perform step S1102.

Figure 12:
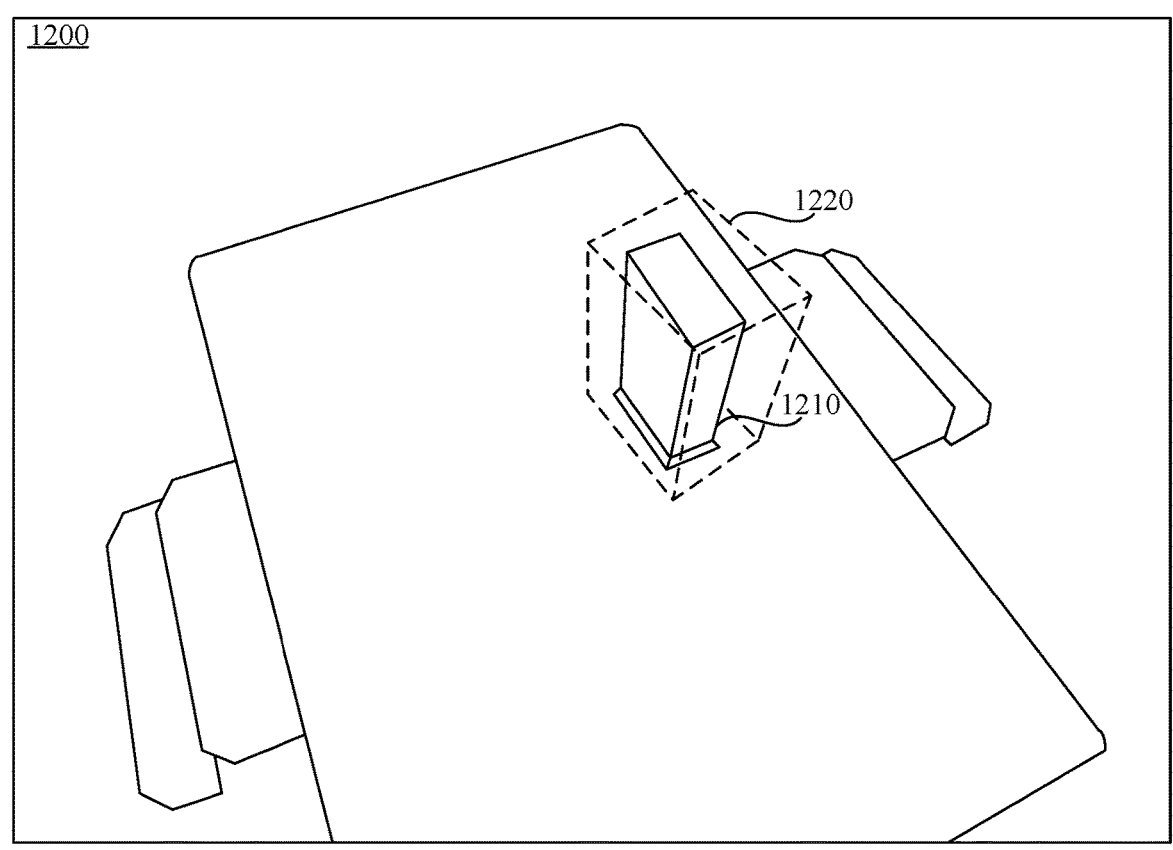
FIG. 12 is a schematic diagram of a collision box provided by an example of the present subject matter.

A model corresponding to the prop station in the virtual environment may be provided with a collision box, as shown in FIG. 12. A virtual environment interface 1200 may include the prop station 1210, and the prop station 1210 may be provided with the collision box 1220 for detecting whether there are virtual objects near the prop station 1210.

In an example, a server will generate game information of a virtual game session before the virtual game session may be started. The game information may include a position of the prop station corresponding to the virtual game session in the virtual environment. In an implementation, the position may be same in each virtual game session, or, the position may be randomly generated by the server before the virtual game session may be started, namely, the position of the prop station in the virtual game session may be randomly generated. The terminal receives the game information sent by the server and generates a corresponding virtual game session according to the game information. When the user controls the virtual object to move to the vicinity of the prop station in the virtual environment, the terminal acquires collision data between the collision box corresponding to the virtual object and the collision box of the prop station, and determines that the virtual object moves to the prop station according to the collision data. In an implementation, the data processing process may further be completed by the server, which may not be limited here.

Step 1102: Display a target control.

When the user operates the virtual object to be close to the prop station, the terminal will display a target control that opens the prop station. The prop station may be opened by triggering the target control, and the prop may be exchanged through the prop station. Schematically, the terminal acquires the collision data of the virtual object and the prop station, and displays the target control in the virtual environment interface.

Step S1103: Determine whether the quantity of virtual exchanging props satisfies exchanging requirements; if yes, perform step S1104; and if no, skip to step S1102.

In response to reception of an exchanging operation for the target quantity of virtual exchanging props, whether the quantity of the virtual exchanging props satisfies the exchanging requirements may be Determined. When the quantity of the virtual exchanging props held by the virtual object reaches a target quantity, the virtual box container summoning prop may be acquired by the virtual object.

Step S1104: Acquire the virtual box container summoning prop.

After the virtual object acquires the virtual box container summoning prop, the virtual prop container may be called by the virtual box container summoning prop.

Step S1105: Determine whether the virtual box container summoning prop may be used; if yes, perform step S1106.

It may be determined that the virtual object uses the virtual box container summoning prop in response to reception of a use signal for the virtual box container summoning prop. In an example, the server receives the use signal of the virtual box container summoning prop sent by the terminal and determines a virtual prop group in the virtual prop container according to the use signal. Before the virtual game session may be started, the target account number sets the virtual prop container. The terminal generates configuration information according to the received setting operation and uploads the configuration information to the server. The server correspondingly stores the configuration information and an account number identifier of the target account number in a memory. After receiving the above-mentioned use signal, the server determines a target account number identifier based on the use signal, reads the corresponding configuration information from the memory, determines the virtual prop group in the virtual prop container according to the configuration information, and returns the corresponding prop information to the terminal, and the terminal displays the virtual prop container in the virtual environment according to the prop information.

Schematically, the use signal may include a target position corresponding to the virtual box container summoning prop, i.e., a position where the virtual prop may be landed.

Figure 13:
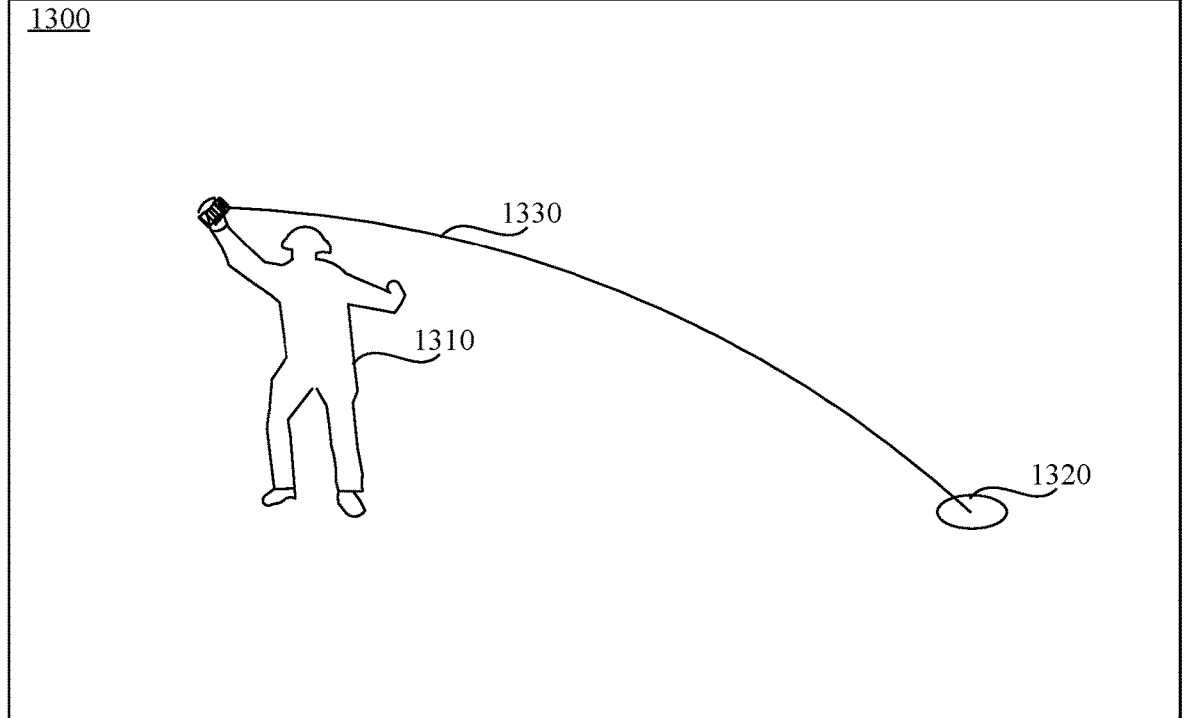
FIG. 13 is a schematic diagram of throwing a virtual box container summoning prop provided by an example of the present subject matter.

Schematically, referring to FIG. 13, the virtual object 1310 in the virtual environment 1300 holds the virtual box container summoning prop and throws the virtual box container summoning prop to the target position 1320. The terminal acquires the throwing direction of the virtual object 1310, then calculates a parabolic path 1330 by the three parameters including the throwing direction and the initial velocity and the gravitational acceleration configured by the system, and determines the target position 1320 according to the parabolic path 1330.

Schematically, the target position selected by the user needs to be a level ground to place the virtual prop container. When the terminal Determines that the target position selected by the user may be a non-level ground, a prompt "the virtual prop container cannot be called" may be displayed. When the user operates the virtual object to throw the virtual box container summoning prop, the terminal may acquire a drop point of the virtual box container summoning prop, i.e., the target position through the throwing direction and the initial velocity and the gravitational acceleration configured by the system, and Determines whether the target position may be a level ground. If the target position may be determined to be a level ground, the virtual box container summoning prop may be thrown out. If the target position may be determined to be a non-level ground, the virtual box container summoning prop cannot be thrown out, and corresponding prompt information may be displayed. The throwing direction, for example, may be determined by the current forward direction of the virtual object or may be determined by the line-of-sight direction of the virtual object from the first-person prospective.

Step S1106: A virtual prop container may be landed at a target position.

The virtual prop container may be displayed at the target position in the virtual environment. Schematically, only the virtual object calling the virtual prop container may observe the virtual prop container, or all the virtual objects in the virtual environment may observe the virtual prop container.

Step S1107: Determine whether the virtual object may be close to the virtual prop container; if yes, perform step S1108.

The virtual prop container may be also provided with a collision box. When the virtual object may be close to the virtual prop container, the collision box will detect the virtual object.

Step S1108: Display the virtual prop list.

After detecting the virtual object through the collision box, the terminal displays a use control of the virtual prop container. After receiving a trigger signal for the use control, the terminal displays the virtual prop list. The virtual prop list may include a virtual prop group. The virtual prop group may be a combination of the virtual props set based on the virtual object before the virtual game session may be started. The virtual prop group may include a target virtual prop.

Step 1109: Determine whether a selection may be received; if yes, perform step S1110; and if no, skip to step S1108.

When a selecting signal for the virtual prop in the virtual prop list may be received, and the target virtual prop may be determined.

Step S1110: Equip the virtual object with the target virtual prop.

The terminal controls the virtual object to acquire the target virtual prop after determining the target virtue prop according to the selection, namely, equips the virtual object with the target virtual prop, and the terminal may use the target virtual prop.

In conclusion, in the examples of the present subject matter, when meeting the prop acquisition condition, the virtual object may acquire the target virtual prop through the virtual prop container in the virtual environment. The target virtual prop may be a virtual prop in the virtual prop group set based on the virtual object before the virtual game session may be started. In the virtual game session, the target position in the virtual environment may be determined, and the virtual prop container may be displayed in the determined target position in response to reception of a using operation for the virtual box container summoning prop. Through interaction between the user and the virtual environment, the time and the position of the virtual prop container appearing in the virtual environment may be controlled, and the position and the time to enable the target virtual prop pre-configured by the user in the virtual prop container may be controlled.

Figures 14, 15:
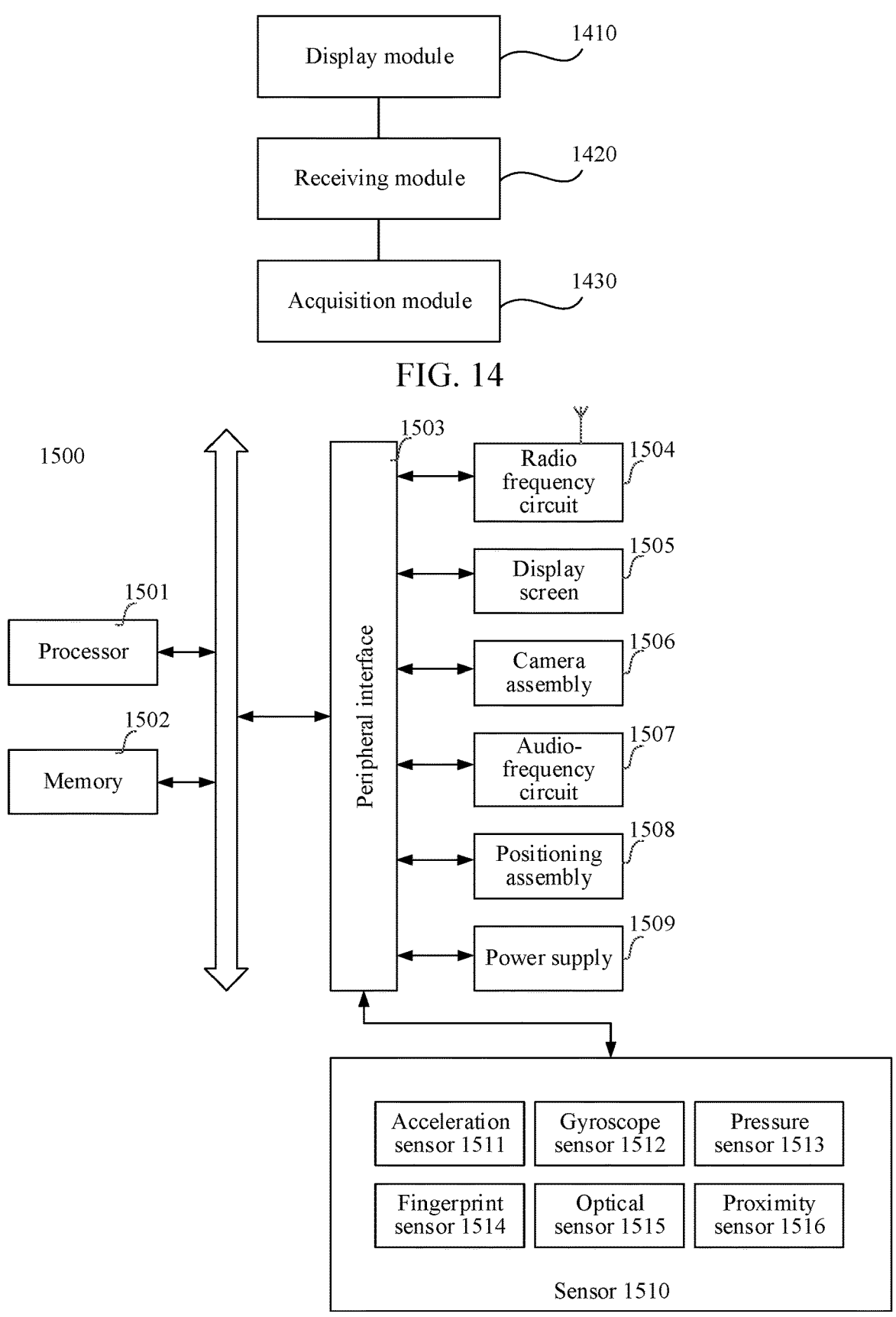
FIG. 14 is a structural block diagram of an apparatus for controlling a human-computer interaction interface provided by an example of the present subject matter.
FIG. 15 is a schematic structural diagram of a terminal according to an example of the present subject matter.

Referring to FIG. 14, it may be a structural block diagram of an apparatus for controlling a human-computer interaction interface provided by an example of the present subject matter. The apparatus may include: a receiving module 1420, configured to receive, before a virtual game session may be started, a setting operation of a virtual prop container, generate configuration information of the virtual prop container according to the received setting operation of the virtual prop container, and store the configuration information of the virtual prop container in a memory; a display module 1410, configured to acquire, in the virtual game session, the configuration information of the virtual prop container from the memory, determine a target position in a virtual environment, and display the virtual prop container in the determined target position in response to a prop box display operation triggered by a virtual object, the virtual environment being used for providing an operating environment of the virtual game session, and the virtual object participating in the virtual game session in the virtual environment, a display module 1410 being further configured to display a virtual prop list based on the configuration information of the virtual prop container in a case that the virtual object matches a prop acquisition condition, the virtual prop list including a virtual prop group, and the virtual prop group being a combination of the virtual props set based on the virtual object before the virtual game session may be started; a receiving module 1420 being further configured to receive a selection of a target virtual prop in the virtual prop group based on the virtual prop list; and an acquisition module 1430, configured to equip the virtual object with the target virtual prop based on the selection.

In an example, the receiving module 1420 may be further configured to receive a trigger for the virtual prop container.

The display module 1410 may be further configured to display the virtual prop list based on the configuration information of the virtual prop container in a case that a distance between the virtual object and the virtual prop container may be within a predetermined distance range.

In an example, the apparatus further may include: a determination module (not shown in the drawings), configured to determine a virtual exchanging prop held by the virtual object in response to reception of a prop box exchanging operation.

The display module 1410 may be further configured to display the virtual prop container in the virtual environment in a case that the virtual exchanging prop held by the virtual object matches a prop exchanging requirement.

In an example, the acquisition module 1430 may be further configured to, perform exchange to obtain a virtual box container summoning prop based on the virtual exchanging prop in a case that the virtual exchanging prop held by the virtual object matches a prop exchanging requirement.

The display module 1410 may be further configured to determine the target position in the virtual environment, and display the virtual prop container in the determined target position in response to reception of a using operation for the virtual box container summoning prop.

In an example, the virtual box container summoning prop may include a signal prop.

The receiving module 1420 may be further configured to receive a throwing operation of the virtual object for the signal prop.

The display module 1410 may be further configured to display the virtual prop container at the target position in the virtual environment in response to the throwing operation to throw the signal prop to the target position in the virtual environment. The display module 1410 may be further configured to determine the target position in the virtual environment based on the throwing operation, and display the virtual prop container in the target position in the virtual environment.

In an example, the receiving module 1420 may be further configured to receive a setting operation for the virtual prop container. The setting operation may be used for configuring the virtual prop list correspondingly displayed in the virtual prop container when the virtual object triggers the virtual prop container in the virtual environment.

The determination module may be further configured to determine the virtual prop group included by the virtual prop list based on the setting operation.

In an example, the apparatus further may include:

a control module (not shown in the drawings), configured to control the virtual object to enter the virtual environment to participate in the virtual game session in response to reception of a game start signal.

In an example, the display module 1410 may be further configured to display an account number prop list, a virtual prop in the account number prop list including at least one virtual prop having an incidence relationship with a target account number corresponding to the virtual object.

The determination module may be further configured to determine the virtual prop group in response to reception of the selection for the virtual prop in the account number prop list.

In an example, the virtual prop may include a virtual firearm, and the account number prop list may include a target virtual firearm.

The display module 1410 may be further configured to display a virtual accessory list corresponding to the target virtual firearm in response to reception of a selection for the target virtual firearm.

The determination module may be further configured to perform virtual accessory configuration on the target virtual firearm to determine a target accessory collocation in response to reception of a selection for a virtual accessory in the virtual accessory list.

The determination module may be further configured to determine the target virtual firearm and the target accessory collocation as a target virtual prop group.

In conclusion, according to the apparatus for controlling a human-computer interaction interface provided by the examples of the present subject matter, the virtual prop container may be preset before the game, configuration information of the virtual prop container may be generated and stored, and in the game, the user controls a certain position determined by the virtual object, reads the stored configuration information, and starts the target virtual prop in the virtual prop container. As the target virtual prop may not be started by the virtual object at the beginning of the game, a server and a terminal do not need to continuously update and process data related to the target virtual prop along with movement of the virtual object in the game before the virtual object starts the target virtual prop, so that the virtual object may use the target virtual prop configured by the user himself/herself under a circumstance of not excessively increasing operations and storage of the server and the terminal and a pressure of network transmission.

The apparatus for controlling a human-computer interaction interface provided in the foregoing examples may be illustrated with an example of division of the foregoing functional modules. In actual application, the functions may be allocated to and completed by different functional modules according to requirements, that is, the internal structure of the device may be divided into different functional modules, to implement all or some of the functions described above. In addition, the apparatus for controlling a human-computer interaction interface and the method for controlling a human-computer interaction interface examples provided in the foregoing examples belong to the same concept. For the specific implementation process, reference may be made to the method examples, and details are not described herein again.

FIG. 15 is a structural block diagram of a terminal 1500 according to an example of the disclosure. The terminal 1500 may include: a smartphone, a tablet computer, a Moving Picture Experts Group Audio Layer III (MP3) player, a Moving Picture Experts Group Audio Layer IV (MP4) player, a notebook computer, or a desktop computer. The terminal 1500 may further be referred to as user equipment, a portable terminal, a laptop terminal, a desktop terminal, or by another name.

Generally, the terminal 1500 may include: a processor 1501 and a memory 1502.

The processor 1501 may include one or more processing cores, for example, a 4-core processor or an 8-core processor. The processor 1501 may be implemented by using at least one hardware form of a digital signal processor (DSP), a field-programmable gate array (FPGA), and a programmable logic array (PLA). The processor 1501 may also include a main processor and a co-processor. The main processor may be a processor for processing data in a wake-up state, also referred to as a central processing unit (CPU). The coprocessor may be a low-power processor configured to process data in a standby state. In some examples, a graphics processing unit (GPU) may be integrated into the processor 1501. The GPU may be configured to be responsible for rendering and drawing content to be displayed on a display screen. In some examples, the processor 1501 may further include an artificial intelligence (AI) processor. The AI processor may be configured to process computing operations related to machine learning.

The memory 1502 may include one or more computer-readable storage media that may be non-transitory. The memory 1502 may further include a high-speed random access memory and a nonvolatile memory, for example, one or more disk storage devices or flash storage devices. In some examples, the non-transitory computer-readable storage medium in the memory 1502 may be configured to store at least one instruction, and the at least one instruction being configured to be executed by the processor 1501 to implement the method provided in the method for controlling a human-computer interaction interface provided in this example of the present subject matter.

In some examples, the terminal 1500 may optionally include a peripheral interface 1503 and at least one peripheral. The processor 1501, the memory 1502, and the peripheral interface 1503 may be connected through a bus or a signal cable. Each peripheral may be connected to the peripheral interface 1503 through a bus, a signal cable, or a circuit board. Specifically, the peripheral device may include: at least one of a radio frequency (RF) circuit 1504, a touch display screen 1505, a camera assembly 1506, an audio circuit 1507, a positioning assembly 1508, or a power supply 1509.

The display screen 1505 may be configured to display a user interface (UI). The UI may include a graph, a text, an icon, a video, and any combination thereof. In a case that the display screen 1505 may be a touch display screen, the display screen 1505 further has a capability of acquiring a touch signal on or above a surface of the display screen 1505. The touch signal may be inputted, as a control signal, to the processor 1501 for processing. In this case, the display screen 1505 may be further configured to provide a virtual button and/or a virtual keyboard that are/is also referred to as a soft button and/or a soft keyboard. In some examples, there may be one display screen 1505 disposed on a front panel of the terminal 1500. In some other examples, there may be two display screens 1505 respectively arranged on different surfaces of the terminal 1500 or in a folded design. In still other examples, the display screen 1505 may be a flexible display screen disposed on a curved surface or a folded surface of the terminal 1500. Even, the display screen 1505 may also be set to a non-rectangular irregular pattern, that is, a special-shaped screen. The display screen 1505 may be made of a material such as a liquid crystal display (LCD) or an organic light-emitting diode (OLED).

The camera component 1506 may be configured to collect images or videos. Optionally, the camera assembly 1506 may include a front-facing camera and a rear-facing camera. Generally, the front-facing camera may be disposed on the front panel of the terminal, and the rear-facing camera may be disposed on a back surface of the terminal. In some examples, there are at least two rear-facing cameras, each being any one of a main camera, a depth of field camera, a wide-angle camera, and a telephoto camera, to implement a Bokeh function through fusion of the main camera and the depth of field camera, panoramic photo shooting and VR shooting functions through fusion of the main camera and wide-angle camera, or another fusion shooting function. In some examples, the camera 1506 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1507 may include a microphone and a speaker. The microphone may be configured to acquire sound waves of a user and an environment, and convert the sound waves into electrical signals and input the electrical signals into the processor 1501 for processing, or input the electrical signals into the radio frequency circuit 1504 to implement voice communication. For the purpose of stereo acquisition or noise reduction, there may be a plurality of microphones, respectively disposed at different portions of the terminal 1500. The microphone may be further an array microphone or an omnidirectional microphone. The speaker may be configured to convert electric signals from the processor 1501 or the RF circuit 1504 into sound waves. The speaker may be a conventional thin-film speaker or a piezoelectric ceramic speaker. When the speaker may be the piezoelectric ceramic speaker, the speaker may not only convert an electric signal into sound waves audible to a human being, but also convert an electric signal into sound waves inaudible to the human being for ranging and other purposes. In some examples, the audio circuit 1707 may further include a headphone jack.

The positioning component 1508 may be configured to determine a current geographic location of the terminal 1500, to implement a navigation or a location based service (LBS). The positioning component 1508 may be a positioning component based on the Global Positioning System (GPS) of the United States, the BeiDou system of China, the Global Navigation Satellite System (GLONASS), or the GALILEO System of the European Union.

In some examples, the terminal 1500 further may include one or more sensors 1510. The one or more sensors 1510 include but are not limited to an acceleration sensor 1511, a gyro sensor 1512, a pressure sensor 1513, a fingerprint sensor 1514, an optical sensor 1515, and a proximity sensor 1516.

The acceleration sensor 1511 may detect a magnitude of acceleration on three coordinate axes of a coordinate system established with the terminal 1500. For example, the acceleration sensor 1511 may be configured to detect components of gravity acceleration on the three coordinate axes. The processor 1501 may control, according to a gravity acceleration signal acquired by the acceleration sensor 1511, the touch display screen 1505 to display the UI in a landscape view or a portrait view. The acceleration sensor 1511 may be further configured to acquire motion data of a game or a user.

The gyroscope sensor 1512 may detect a body direction and a rotation angle of the terminal 1500, and the gyroscope sensor 1512 may collect a 3D motion of the terminal 1500 by a user in cooperation with the acceleration sensor 1511. The processor 1501 may implement the following functions according to the data collected by the gyro sensor 1512: motion sensing (for example, change of the UI based on a tilt operation of the user), image stabilization during photographing, game control, and inertial navigation.

The pressure sensor 1513 may be disposed at a side frame of the terminal 1500 and/or a lower layer of the display screen 1505. When the pressure sensor 1513 may be disposed at the side frame of the terminal 1500, a holding signal of the user on the terminal 1500 may be detected. The processor 1501 performs left and right hand recognition or a quick operation according to the holding signal acquired by the pressure sensor 1513. When the pressure sensor 1513 may be disposed on the low layer of the touch display screen 1505, the processor 1501 controls, according to a pressure operation of the user on the display screen 1505, an operable control on the UI. The operable control may include at least one of a button control, a scroll-bar control, an icon control, or a menu control.

The fingerprint sensor 1514 may be configured to collect a user's fingerprint, and the processor 1501 identifies a user's identity according to the fingerprint collected by the fingerprint sensor 1514, or the fingerprint sensor 1514 identifies a user's identity according to the collected fingerprint. When the identity of the user may be identified as a trusted identity, the processor 1501 authorizes the user to perform related sensitive operations. The sensitive operations include: unlocking a screen, viewing encrypted information, downloading software, paying, changing a setting, and the like. The fingerprint sensor 1514 may be disposed on a front surface, a back surface, or a side surface of the terminal 1500. When a physical button or a vendor logo may be disposed on the terminal 1500, the fingerprint sensor 1514 may be integrated with the physical button or the vendor logo.

The optical sensor 1515 may be configured to collect ambient light intensity. In an example, the processor 1501 may control display luminance of the touch display screen 1505 according to the ambient light intensity collected by the optical sensor 1515. Specifically, in a case that the ambient light intensity may be relatively high, the display brightness of the touch display 1505 may be increased. In a case that the ambient light intensity may be relatively low, the display brightness of the touch display 1505 may be reduced. In another example, the processor 1501 may further dynamically adjust a shooting parameter of the camera component 1506 according to the ambient light intensity collected by the optical sensor 1515.

The proximity sensor 1516, also referred to as a distance sensor, may be generally disposed on the front panel of the terminal 1500. The proximity sensor 1516 may be configured to acquire a distance between the user and the front surface of the terminal 1500. In one example, when the proximity sensor 1516 detects that the distance between the user and the front surface of the terminal 1500 may be gradually reduced, the processor 1501 controls the touch display screen 1505 to switch from a screen-on state to a screen-off state. When the proximity sensor 1716 detects that the distance between the user and the front surface of the terminal 1500 gradually increases, the touch screen 1501 may be controlled by the processor 1505 to switch from the screen-off state to the screen-on state.

A person skilled in the art may understand that the structure shown in FIG. 15 constitutes no limitation on the terminal 1500, and the terminal may include more or fewer components than those shown in the figure, or some components may be combined, or a different component deployment may be used.

A person of ordinary skill in the art may understand that all or some of the steps of the methods in the examples may be implemented by a program instructing relevant hardware. The program may be stored in a non-transitory computer-readable storage medium. The computer-readable storage medium may be the computer-readable storage medium included in the memory in the foregoing example, or may be a computer-readable storage medium that exists independently and that may not be assembled in a terminal. The computer-readable storage medium stores at least one instruction, at least one program, a code set, or an instruction set, the at least one instruction, the at least one program, the code set, or the instruction set being loaded and executed by the processor to implement the method for controlling a human-computer interaction interface according to any one of the foregoing examples of the present subject matter.

Optionally, the computer-readable storage medium may include: a ROM, a RAM, a solid state drive (SSD), an optical disc, or the like. The RAM may include a resistance random access memory (ReRAM) and a dynamic random access memory (DRAM). The sequence numbers of the foregoing examples of the present subject matter are merely for description purpose, and are not intended to indicate the preference among the examples.

A person of ordinary skill in the art may understand that all or some of the steps of the foregoing examples may be implemented by hardware, or may be implemented by a program instructing relevant hardware. The program may be stored in a non-transitory computer-readable storage medium. The storage medium may be a read-only memory, a magnetic disk, an optical disc, or the like.

The foregoing descriptions are merely optional examples of the present subject matter, but are not intended to limit the present subject matter. Any modification, equivalent replacement, or improvement made within the spirit and principle of the present subject matter shall fall within the protection scope of the present subject matter.

What is claimed is:

1. A method for controlling a human-computer interaction interface, comprising:

receiving, before a virtual game session is started, a setting operation of a virtual prop container by a user account;

generating configuration information of the virtual prop container according to the setting operation of the virtual prop container, wherein the configuration information is associated with the user account;

starting the virtual game session;

in response to a virtual object corresponding to the user account satisfying a triggering condition, displaying the virtual prop container in a virtual environment of the virtual game session, wherein the triggering condition comprises:

performing, when the virtual object holds a virtual exchanging prop and the virtual exchanging prop matches a prop exchanging requirement, exchange to obtain a virtual box container summoning prop based on the virtual exchanging prop; and in response to a prop acquisition operation performed by the virtual object on the virtual prop container, granting a virtual prop to the virtual object according to the configuration information.

2. The method according to claim 1, wherein the displaying the virtual prop container in a virtual environment of the virtual game session is in response to receiving an activation operation of the virtual object.

3. The method according to claim 2, wherein the activation operation is usage of a virtual box container summoning prop.

4. The method according to claim 3, the method further comprising:

exchanging a quantity of virtual resources possessed by the virtual object for the virtual box container summoning prop.

5. The method according to claim 4, wherein the exchanging happens in proximity of a prop station located in the virtual environment.

6. The method according to claim 1, wherein the granting the virtual prop to the virtual object according to the configuration information comprises:

displaying a virtual prop list based on the configuration information of the virtual prop container;

receiving a selection of a target virtual prop from the virtual prop list; and granting the target virtual prop to the virtual object.

7. The method according to claim 6, wherein the configuration information comprises the virtual prop list, and the setting operation of a virtual prop container comprises:

selection of one or more virtual props from a virtual prop library to form the virtual prop list.

8. The method according to claim 7 further comprising: determining a size of the virtual prop list.

9. The method according to claim 3, further comprising:

determining a target position in the virtual environment according to the activation operation of the virtual object; and displaying the virtual prop container in the determined target position.

10. An apparatus for controlling a human-computer interaction interface, comprising:

a receiver configured to:

receive, before a virtual game session is started, a setting operation of a virtual prop container by a user account;

generate configuration information of the virtual prop container according to the setting operation of the virtual prop container, wherein the configuration information is associated with the user account; and receive, from a user, a game start control to start the virtual game session; and a display configured to:

in response to a virtual object corresponding to the user account satisfying a triggering condition, display the virtual prop container in a virtual environment of the virtual game session, wherein the triggering condition comprises performing, when the virtual object holds a virtual exchanging prop and the virtual exchanging prop matches a prop exchanging requirement, exchange to obtain a virtual box container summoning prop based on the virtual exchanging prop, the display is further configured to display a virtual prop list based on the configuration information of the virtual prop container, and the receiver is further configured to receive a selection of a target virtual prop from the virtual prop list; and an acquirer configured to grant the target virtual prop to the virtual object in response to a prop acquisition operation performed by the virtual object on the virtual prop container according to the configuration information.

11. The apparatus according to claim 10, wherein the display is further configured to:

display the virtual prop container in a virtual environment of the virtual game session in response to receipt of an activation operation of the virtual object.

12. The apparatus according to claim 11, wherein the activation operation is usage of a virtual box container summoning prop.

13. The apparatus according to claim 12, wherein the virtual object is configured to exchange a quantity of virtual resources possessed by the virtual object for the virtual box container summoning prop.

14. The apparatus according to claim 13, wherein the exchange happens in proximity of a prop station located in the virtual environment.

15. The apparatus according to claim 10, wherein the receiver is further configured to receive a trigger for the virtual prop container; and the display is further configured to display the virtual prop list based on the configuration information of the virtual prop container in a case that a distance between the virtual object and the virtual prop container is within a predetermined distance range.

16. The apparatus according to claim 10, wherein the configuration information comprises the virtual prop list, and the setting operation of a virtual prop container comprises:

selection of one or more virtual props from a virtual prop library to form the virtual prop list.

17. The apparatus according to claim 16, wherein a size is determined for the virtual prop list.

18. The apparatus according to claim 10, further comprising:

a determiner configured to determine a virtual exchanging prop held by the virtual object in response to reception of a prop box exchanging operation, wherein the acquirer is further configured to perform exchange to obtain a virtual box container summoning prop based on the virtual exchanging prop in a case that the virtual exchanging prop held by the virtual object matches a prop exchanging requirement.

19. The apparatus according to claim 11, wherein the display is further configured to:

determine a target position in the virtual environment according to the activation operation of the virtual object, and display the virtual prop container in the determined target position.

20. A non-transitory computer-readable storage medium, storing at least one piece of program code, wherein the program code, when loaded and executed by one or more processors, configures the one or more processors to:

receive, before a virtual game session is started, a setting operation of a virtual prop container by a user account;

generate configuration information of the virtual prop container according to the setting operation of the virtual prop container, wherein the configuration information is associated with the user account;

start the virtual game session;

in response to a virtual object corresponding to the user account satisfying a certain triggering condition, display the virtual prop container in a virtual environment of the virtual game session, wherein the triggering condition comprises:

performing, when the virtual object holds a virtual exchanging prop and the virtual exchanging prop matches a prop exchanging requirement, exchange to obtain a virtual box container summoning prop based on the virtual exchanging prop; and in response to a prop acquisition operation performed by the virtual object on the virtual prop container, grant a virtual prop to the virtual object according to the configuration information.

\* \* \* \* \*